US008257167B2

(12) United States Patent
Fujimori et al.

(10) Patent No.: US 8,257,167 B2
(45) Date of Patent: Sep. 4, 2012

(54) GAMING SYSTEM FOR PLAYING COMMON GAME IN GROUPS AND CONTROL METHOD THEREOF

(75) Inventors: Kenichi Fujimori, Tokyo (JP); Arata Ajiro, Tokyo (JP); Tsuyoshi Ohira, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 579 days.

(21) Appl. No.: 12/406,178

(22) Filed: Mar. 18, 2009

(65) Prior Publication Data

US 2009/0239645 A1 Sep. 24, 2009

Related U.S. Application Data

(60) Provisional application No. 61/038,638, filed on Mar. 21, 2008.

(51) Int. Cl.
*A63F 9/24* (2006.01)
*A63F 13/00* (2006.01)
*G06F 17/00* (2006.01)
*G06F 19/00* (2006.01)

(52) U.S. Cl. .............................. 463/24; 463/20; 463/29

(58) Field of Classification Search .................... 463/20, 463/24, 29

See application file for complete search history.

(56) References Cited

U.S. PATENT DOCUMENTS

2003/0073486 A1 4/2003 Okada
2006/0211485 A1* 9/2006 Fujimoto ........................ 463/25
2008/0171583 A1* 7/2008 Hutchinson-Kay ............... 463/7
2008/0176639 A1* 7/2008 Okada ............................. 463/25
2010/0261522 A1* 10/2010 Hutchinson-Kay ............. 463/25

* cited by examiner

*Primary Examiner* — Jarrett Stark

(74) *Attorney, Agent, or Firm* — KMF Patent Services, PLLC; Kenneth M. Fagin

(57) ABSTRACT

A gaming system includes a plurality of gaming machines and a control device connected to the gaming machines. Each of the gaming machines has: a display device, which displays a plurality of symbols; a controller, which performs a process of rearranging symbols arranged on the display devices after gaming mediums are betted, and thereafter, executing a base game in which a payment is made in accordance with the rearranged symbols; and a communication interface, which transmits information pertinent to the betted gaming mediums to the control device, together with information for identifying a transmission source. The control device has: a memory, which stores identification information for identifying a gaming machine participated in a common game executed simultaneously in groups and identification information for identifying a group to which the gaming machine belongs in association with each other; a communication interface, which receives information transmitted from each of the gaming machines; and a controller, which executes a process of specifying a group to which a transmission source of information received by the communication interface, based upon the information stored in the memory and a process of accumulatively summing up a reserved amount by the specified group, and then, storing the sum in the memory in order to reserve part of the gaming mediums betted at the gaming machine as the transmission source in groups to which the gaming machines belong.

3 Claims, 25 Drawing Sheets

FIG.3

| | LEFT REEL | MIDDLE REEL | RIGHT REEL |
|---|---|---|---|
| CODE NO. | SYMBOLS | SYMBOLS | SYMBOLS |
| 00 | JACKPOT 7 | JACKPOT 7 | JACKPOT 7 |
| 01 | PLUM | BELL | CHERRY |
| 02 | ORANGE | APPLE | ORANGE |
| 03 | PLUM | BELL | APPLE |
| 04 | ORANGE | CHERRY | ORANGE |
| 05 | PLUM | ORANGE | PLUM |
| 06 | ORANGE | PLUM | ORANGE |
| 07 | PLUM | CHERRY | PLUM |
| 08 | BLUE 7 | BELL | ORANGE |
| 09 | CHERRY | APPLE | PLUM |
| 10 | ORANGE | BELL | ORANGE |
| 11 | BELL | STRAWBERRY | PLUM |
| 12 | ORANGE | PLUM | BELL |
| 13 | STRAWBERRY | BLUE 7 | STRAWBERRY |
| 14 | BLUE 7 | BELL | BLUE 7 |
| 15 | ORANGE | APPLE | BELL |
| 16 | APPLE | BELL | CHERRY |
| 17 | PLUM | STRAWBERRY | PLUM |
| 18 | ORANGE | PLUM | ORANGE |
| 19 | PLUM | CHERRY | PLUM |
| 20 | BLUE 7 | BELL | ORANGE |
| 21 | CHERRY | APPLE | PLUM |

FIG.7

GROUP MANAGEMENT TABLE

| GAME MACHINE ID NUMBER | GROUP ID NUMBER |
|---|---|
| 001 | 01 |
| 002 | |
| 003 | |
| 004 | |
| 005 | 02 |
| 006 | |
| 007 | |
| 008 | |

FIG.8

RESERVED-AMOUNT MANAGEMENT TABLE

| GROUP ID NUMBER | ACCUMULATIVE RESERVED AMOUNT |
|---|---|
| 01 | 60000 |
| 02 | 120000 |

FIG.9

TABLE OF LINK GAME ESTABLISHMENT FLAGS

| GROUP ID NUMBERS | LINK GAME ESTABLISHMENT FLAGS |
|---|---|
| 01 | BEING ESTABLISHED |
| 02 | WAITING |

FIG.10

LOTTERY RIGHT MANAGEMENT TABLE

| GROUP ID NUMBERS | RANKING | GAMING MACHINE ID NUMBERS |
|---|---|---|
| 01 | 1 | 001 |
| | 2 | 004 |
| | 3 | 001 |
| | 4 | 004 |
| | 5 | 003 |
| | ⋮ | ⋮ |

| GROUP ID NUMBERS | RANKING | GAMING MACHINE ID NUMBERS |
|---|---|---|
| 02 | 1 | 005 |
| | 2 | 006 |
| | 3 | 008 |
| | 4 | 007 |
| | 5 | 005 |
| | ⋮ | ⋮ |

FIG.15

| WINNING COMBINATION | | | POSSIBILITY OF ESTABLISHMENT (%) | PAYOUT COUNT |
|---|---|---|---|---|
| CHANCE TRIGGER | | | 0.5 | |
| JACKPOT 7 | JACKPOT 7 | JACKPOT 7 | 0.5 | 30 |
| BLUE 7 | BLUE 7 | BLUE 7 | 0.8 | 10 |
| BELL | BELL | BELL | 1.1 | 8 |
| CHERRY | CHERRY | CHERRY | 1.5 | 5 |
| STRAWBERRY | STRAWBERRY | STRAWBERRY | 1.5 | 5 |
| PLUM | PLUM | PLUM | 1.8 | 4 |
| ORANGE | ORANGE | ORANGE | 2.3 | 3 |
| CHERRY | CHERRY | (ANY) | 3.0 | 2 |
| ORANGE | ORANGE | (ANY) | 3.0 | 2 |
| CHERRY | (ANY) | (ANY) | 7.5 | 1 |
| ORANGE | (ANY) | (ANY) | 7.5 | 1 |

FIG.19
33
Major Jackpot
$4,333.20
CONGRATURATIONS!

FIG.23

| CODE NO. | INDEX | STEP NO. (*) |
|---|---|---|
| 00 | 1 | 0 |
| 01 | | 18 |
| 02 | | 36 |
| 03 | | 54 |
| 04 | | 72 |
| 05 | | 91 |
| 06 | | 109 |
| 07 | | 127 |
| 08 | | 145 |
| 09 | | 163 |
| 10 | | 182 |
| 11 | 2 | 200 |
| 12 | | 218 |
| 13 | | 236 |
| 14 | | 254 |
| 15 | | 273 |
| 16 | | 291 |
| 17 | | 309 |
| 18 | | 327 |
| 19 | | 345 |
| 20 | | 364 |
| 21 | | 382 |

* STEP NO. DETERMINED WHEN INDEX 1 IS DEFINED AS REFERENCE

GAMING SYSTEM FOR PLAYING COMMON GAME IN GROUPS AND CONTROL METHOD THEREOF

CROSS-REFERENCE TO RELATED APPLICATIONS

This application claims priority of U.S. Provisional Application No. 61/038,638 filed on Mar. 21, 2008. The contents of this application are incorporated herein by reference in their entirety.

BACKGROUND OF THE INVENTION

1. Technical Field

The present invention relates to a gaming machine for playing a common game in groups and a control method thereof.

2. Description of the Related Art

Conventionally, in gaming facilities in which gaming machines such as slot machines are installed, players can enjoy games by inserting a variety of gaming mediums such as coins and cashes. Each of the gaming machines is designed so as to pay out a payment according to a winning prize (game outcome) that takes place in the progress of a game.

In a casino in which a plurality of slot machines are installed, there is a so called "jackpot" from which, after part of the credit consumed in each of the slot machines has been reserved, if the amount of the reservation reaches a predetermined amount of money, a large amount of payout is made such that a payment is not paid out to any of the slot machines in an ordinary hit (see Published US Patent Application No. 2003/073486, for example). In such slot machines, in the ordinary case, a hit takes place at each of the set probabilities, and players conduct games while anticipating the hit. By means of a lottery other than that of the ordinary hit, which is based upon each of the probabilities set in the slot machines, a jackpot hit will take place on any of the slot machines with a predetermined timing.

Further, a system is also proposed in which, while a plurality of gaming machines is defined as one group, credit is reserved cooperatively in the group to establish a fund of a jackpot, and thereafter, a common game (link game) is performed when lottery of the jackpot is performed. In such common game, players in the group participate simultaneously, so that they are allowed to motivate rivalry and maintain their interest and concern for a long time.

However, the common game is not always performed, and is performed with a randomly determined timing, for example. Therefore, the conventional gaming system entails a problem that, if control devices, which perform processing pertinent to the common game, are incorporated in game machines or in groups, the availability of each of the control devices is very low, resulting in a wasteful system configuration.

The present invention has been made in view of such circumstance, and aims to provide a gaming system and a control method of the gaming system in which, after a timing of starting the common game is adjusted in groups, while the common game is executed in one group, if a timing of executing the common game is established in another group, the execution of the common game in another group is postponed, whereby the processing pertinent to the common game performed in a plurality of groups can be performed by means of one control device, and further, hardware resources can be efficiently utilized.

SUMMARY OF THE INVENTION

A first aspect of the present invention is directed to a gaming system, including: a plurality of gaming machines; and a control device connected to the gaming machines, wherein each of the gaming machines has: a display device, which displays a plurality of symbols; a controller, which performs a process of rearranging symbols arranged on the display devices after gaming mediums are betted, and thereafter, executing a base game in which a payment is made in accordance with the rearranged symbols; and a communication interface, which transmits information pertinent to the betted gaming mediums to the control device, together with information for identifying a transmission source, and wherein: the control device has: a memory, which stores identification information for identifying a gaming machine participated in a common game executed simultaneously in groups and identification information for identifying a group to which the gaming machine belongs in association with each other; a communication interface, which receives information transmitted from each of the gaming machines; and a controller, which executes a process of specifying a group to which a transmission source of information received by the communication interface belongs, based upon the information stored in the memory, and a process of accumulatively summing up a reserved amount in the specified group, and then, storing the sum in the memory in order to reserve part of the gaming mediums betted at the gaming machine as the transmission source in groups to which the gaming machines belong.

According to the aforementioned gaming system, in each of the gaming machines, the game (base game) in which a payment is made according to the rearranged symbols is performed. The information pertinent to game mediums betted in the base game and the information pertinent to the transmission source are transmitted to the control device. The gaming machines are grouped every time the common game is simultaneously performed, and the information for identifying groups and the identification information pertinent to the gaming machines belonging to each of the groups are stored in the memory of the control device in association therewith. Upon the receipt of the information transmitted from one of the gaming machines, the control device specifies a group to which such one gaming machine belongs. Further, the control device accumulatively sums up a reserved amount by the specified group, and then, stores the sum in the memory.

Accordingly, the control device can manage information pertinent to the reservation in groups (that forms a fund of common game executed in each of the groups) in all. Thus, the information pertinent to the group in which the largest amount of funds was accumulated is broadcasted to the surrounding spectators or the like, the spectators' attention is focused to that group, leading to the liveliness of gaming facility. Further, it is expected that the players who are playing games in the gaming machines execute more base games in seeking to attract the spectators' attention. Therefore, it is possible to prompt the players to bet gaming mediums and increase the profits of the gaming facility in which the aforementioned gaming systems are installed.

A second aspect of the present invention is directed to the gaming machine of the first aspect, wherein: the controller of the control device performs: a process of executing part of computation required to execute the common game; a process of determining a timing of transferring the base game to the common game in groups; a process of starting the common game at a gaming machine belonging to one group, in a case where the timing is established in said one group; and a process of postponing commencement of the common game in another group in a case where the timing is established in said another group while the common game is executed in said one group.

According to the aforementioned gaming system, the controller of the control device executes part of the computation required to execute the common game. The computation executed by the controller of the control device can include: a process of determining the lottery for a jackpot in each of the gaming machines; and a process of determining a progressive payment amount in the common game. In addition, if the timing of transfer to the common game in one group is established, the common game is started in a gaming machine belonging to that group. Further, if a group which is performing the common game exists, even if the timing of transfer to the common game in another group is established, the commencement of the common game is postponed as to the gaming machine belonging to that group.

The common game is not always performed, and is performed with a randomly determined timing, for example. Thus, if controllers, which perform processing pertinent to the common game, are incorporated in game machines or in groups, the availability of each of the controllers is very low, resulting in a wasteful system configuration. In the gaming machine of the present invention, after a timing of starting a link game has been adjusted in groups, while a link game is executed in one group, if a timing of executing a link game in another group is established, the execution of the link game in such another group is postponed. Therefore, one control device can execute processes pertinent to link games performed in a plurality of groups. As a result thereof, the availability of the control device can be increased, and hardware resources can be efficiently utilized.

A third aspect of the present invention is directed to the gaming machine of the first aspect, including, in groups, common display devices connected to respective ones of the gaming machines belonging to the groups, wherein one of the common display devices provided in the groups has the control device.

According to the aforementioned gaming system, the common display devices are connected in groups, and one of these display devices is provided with the control device that performs processes such as reservation of gaming mediums in groups, adjustment of the timing of starting the common game, and required computation or the like in common game.

According to the aforementioned configuration, the effect images of the common games performed in groups can be displayed on the common display devices. Further, one of the common display devices is constituted to have functions of reserving gaming mediums in groups, adjusting a timing of starting a common game, and performing required computation in the common game or the like, thereby making it unnecessary to additionally provide a control device.

A fourth aspect of the present invention is directed to a gaming system, including: a plurality of gaming machines; and a control device connected to the gaming machines, wherein each of the gaming machines has: a display device, which displays a plurality of symbols; a controller, which performs a process of rearranging symbols arranged on the display devices after gaming mediums are betted, and thereafter, executing a base game in which a payment is made in accordance with the rearranged symbols; and a communication interface, which transmits information pertinent to the betted gaming mediums to the control device, together with information for identifying a transmission source, and wherein: the control device has: a memory, which stores identification information for identifying a gaming machine participated in a common game executed simultaneously in groups and identification information for identifying a group to which the gaming machine belongs in association with each other; a communication interface, which receives information transmitted from each of the gaming machines; and a controller, which executes a process of specifying a group to which a transmission source of information received by the communication interface, based upon the information stored in the memory, a process of accumulatively summing up a reserved amount in the specified group, and then, storing the sum in the memory in order to reserve part of the gaming mediums betted at the gaming machine as the transmission source in groups to which the gaming machines belong, a process of executing part of computation required to execute the common game; a process of determining a timing of transferrin the base game to the common game in groups; a process of starting the common game at a gaming machine belonging to one group, in a case where the timing is established in said one group; and a process of postponing commencement of the common game in another group in a case where the timing is established in said another group while the common game is executed in said one group.

According to the aforementioned gaming system, in the gaming machines, the game (base game) in which a payment is made according to the rearranged symbols is performed. The information pertinent to game mediums betted in the base game and the information pertinent to the transmission source are transmitted to the control device. The gaming machines are grouped every time the common game is simultaneously performed, and the information for identifying groups and the identification information pertinent to the gaming machines belonging to each of the groups are stored in the memory of the control device in association therewith. Upon the receipt of the information transmitted from one of the gaming machines, the control device specifies a group to which such one gaming machine belongs. Further, the control device accumulatively sums up a reserved amount by the specified group, and then, stores the sum in the memory.

Further, the controller of the control device executes part of the computation required to execute the common game. The computation executed by the controller of the control device can include: a process of determining the lottery for a jackpot in each of the gaming machines; and a process of determining a progressive payment amount in the common game. In addition, if the timing of transfer to the common game in one group is established, the common game is started in a gaming machine belonging to that group. Further, if a group which is performing the common game exists, even if the timing of transfer to the common game in another group is established, the commencement of the common game is postponed as to the gaming machine belonging to that group.

Accordingly, the control device can manage information pertinent to the reservation in groups (which forms a fund of common game executed in each of the groups) in all. Thus, the information pertinent to the group in which the largest amount of funds was accumulated is broadcasted to the surrounding spectators or the like, the spectators' attention is focused to that group, leading to the liveliness of gaming facility. Further, it is expected that the players who are playing games in the gaming machines execute more base games in seeking to attract the spectators' attention. Therefore, it is possible to prompt the players to bet gaming mediums and increase the profits of the gaming facility in which the aforementioned gaming systems are installed.

The common game is not always performed, and is performed with a randomly determined timing, for example.

Thus, if controllers, which perform processing pertinent to the common game, are incorporated in game machines or in groups, the availability of each of the controllers is very low, resulting in a wasteful system configuration. In the gaming machine of this application, after a timing of starting a link game has been adjusted in groups, while a link game is executed in one group, if a timing of executing a link game in another group is established, the execution of the link game in such another group is postponed. Therefore, one control device can execute processes pertinent to link games performed in a plurality of groups. As a result thereof, the availability of the control device can be increased, and hardware resources can be efficiently utilized.

A fifth aspect of the present invention is directed to a control method of performing a common game in groups consisting of a plurality of gaming machines, said method comprising the steps of: at each of the gaming machines, rearranging symbols arranged on the display devices after gaming mediums are betted, and thereafter, executing a base game in which a payment is made in accordance with the rearranged symbols; and transmitting information pertinent to betted gaming mediums and information for identifying a transmission source to a control device connected via a communication interface, and, at the control device, specifying a group to which a transmission source of received information belongs; and accumulatively summing up a reserved amount in the specified group, and then, storing the sum in the memory in order to reserve part of the gaming mediums betted at the gaming machine as the transmission source in groups to which the gaming machines belong.

According to the aforementioned control method, in each of the gaming machines, the game (base game) in which a payment is made according to the rearranged symbols is performed. The information pertinent to game mediums betted in the base game and the information pertinent to the transmission source are transmitted to the control device. The gaming machines are grouped every time the common game is simultaneously performed, and the information for identifying groups and the identification information pertinent to the gaming machines belonging to each of the groups are stored in the memory of the control device in association therewith. Upon the receipt of the information transmitted from one of the gaming machines, the control device specifies a group to which such one gaming machine belongs. Further, the control device accumulatively sums up a reserved amount by the specified group, and then, stores the sum in the memory.

Accordingly, the control device can manage information pertinent to the reservation in groups (that forms the fund of the common game executed in each of the groups) in all. Thus, for example, the information pertinent to the group in which the largest amount of fund was accumulated is broadcasted to the surrounding spectators or the like, the spectators' attention is focused to that group, leading to the liveliness of gaming facility. Further, it is expected that the players who are playing games in the gaming machines execute more base games in seeking to attract the spectators' attention. Therefore, it is possible to prompt the players to bet gaming mediums and increase the profits of the gaming facility in which the aforementioned gaming systems are installed.

BRIEF DESCRIPTION OF THE SEVERAL VIEWS OF THE DRAWINGS

FIG. 3 is a schematic view showing arrangement of symbols drawn on outer peripheries of reels;

FIG. 7 is a schematic view showing an exemplary group management table included in the control device;

FIG. 8 is a schematic view showing an exemplary reserved-amount management table;

FIG. 9 is a schematic view explaining a link game establishment flag;

FIG. 10 is a schematic view showing an exemplary lottery right management table;

FIG. 15 is an explanatory view of a relationship between plural types of winning combinations and possibilities of establishing each of the winning combinations and payout numbers in the present embodiment;

FIG. 23 is a schematic view showing a correlation table between the number of steps and code Nos.;

DESCRIPTION OF THE PREFERRED EMBODIMENTS

Figure 1:
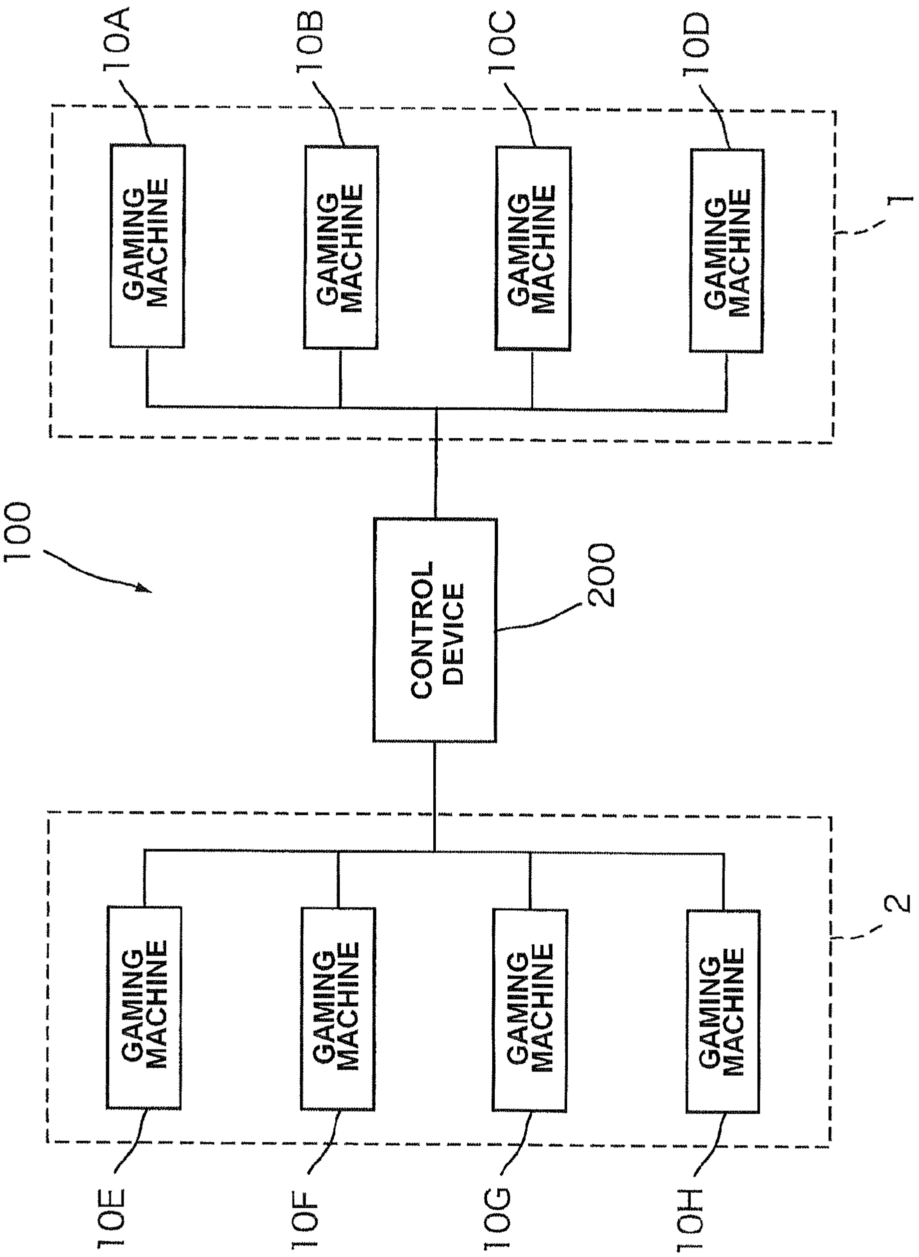
FIG. 1 is a schematic view showing an entire configuration of a gaming system according to a first embodiment.

Hereinafter, embodiments of the present invention will be described in detail, referring to the drawings.

First Embodiment

FIG. 1 is a schematic view showing an entire configuration of a gaming system according to a first embodiment. A gaming system 1 is provided with: a plurality of gaming machines 10A to 10H; and a control device 200 connected to these gaming machines 10A to 10H via a communication line 101. Such gaming system 100, which is capable of performing a variety of games, may be constructed in one gaming facility such as a bar or a casino, or alternatively, may be constructed among a plurality of gaming facilities. The gaming system 1 may be constructed in one gaming facility on a floor-by-floor basis or on a section-by-section basis in the gaming facility. The communication line 101 may be wired or wireless, without being limitative in particular, or alternatively, a leased or switched line may be employed. In the following description, the gaming machines 10A to 10H will be simply referred to as gaming machines 10 if there is no need to discriminately explaining them.

In the present embodiment, the gaming machines 10 are equivalent to slot machines. In the invention, however, the gaming machines may be so called single gaming machines such as video slot machines or video card games, for example, without being limitative to the slot machines. Alternatively, they are so called mass-entertainment-type gaming machines (multi-terminal gaming machines) which perform games such as a horserace game, a bingo game, and a lottery, for example, requiring a predetermined time until the game outcomes are displayed.

In the gaming machine 10, coins, bills, or electronic valuable information are employed as gaming mediums. In the present invention, however, medals, tokens, electronic money, or tickets, for example, may be employed as gaming mediums without being limitative thereto in particular. As the abovementioned tickets, for example, bar code-attached tickets, as described later, may be employed without being limitative thereto in particular.

In the gaming machines 10, a game is performed in which gaming mediums of which number is not greater than a maximum predetermined BET number are betted, and thereafter, a plurality of symbols are variably displayed on reels (see FIG. 2) serving as symbol display devices. Further, the variably displayed symbols are displayed in a stopped state, and the amount of payment is determined according to the symbols displayed in a stopped state or a combination of the displayed symbols (hereinafter, referred to as a base game which is generally performed in a slot machine or the like). Information pertinent to the gaming mediums that were betted in the base game is notified to the control device 200, and then, some of the betted mediums are reserved in the control device 200. The gaming mediums that were reserved in the control device 200 are used as funds for jackpots.

In the gaming system 1, a link game (common game of the invention), in which a plurality of gaming machines 10 participate simultaneously, is performed. The link game is a kind of so called progressive jackpot, and is a game such that players can obtain a payment including an addition of the reserved amount pooled by each of the gaming machines 10. In the present embodiment, a plurality of gaming machines 10, which participate in one link game, is specified as a group. In the example shown in FIG. 1, gaming machines 10A to 10D form one group (group 1), and gaming machines 10E to 10H form another group (group 2). As identification information for identifying each of the groups, group ID number "01" is assigned to group 1 to which the gaming machines 10A to 10D belongs, and group ID number "02" is assigned to group 2 to which the gaming machines 10E to 10H belong.

The control device 200 serves to control a plurality of gaming machines 10. In particular, in the embodiment, the control device 200 functions to: manage a reserve as a fund for a link game; manage a lottery right in the link game won by each of the gaming machines 10; control establishment of the link game in each of the groups; and determine a payment in the link game, based upon the lottery right won by each of the gaming machines 10.

The control device 200 may function as a so called hall server installed in a gaming facility having a plurality of gaming machines 10 or equipment such as a server which manages a plurality of gaming facilities in all. Unique ID numbers are assigned to the gaming machines 10, respectively, and the control device 200 discriminates a source of data sent from each of the gaming machines, in accordance with the ID number. Further, if the control device 200 transmits data to the gaming machine 10 as well, a transmission destination is specified using the ID number.

The ID numbers of the gaming machines are equivalent to identification information pertinent to the gaming machines in the present invention. In the present invention, the identification information pertinent to the gaming machines is not limitative in particular, and can include characters, signs, numbers, and combinations thereof, for example.

Figure 2:
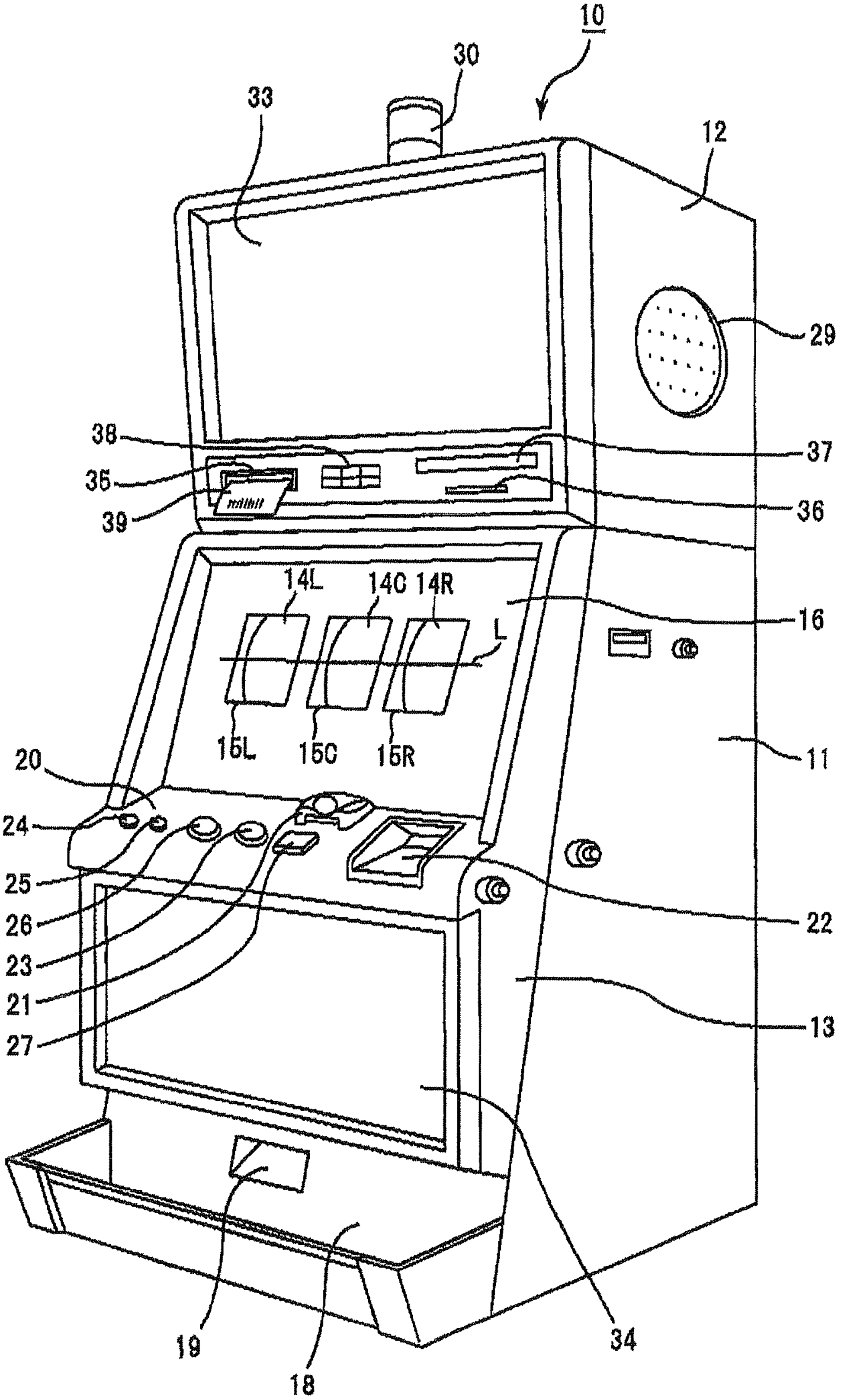
FIG. 2 is a perspective view schematically depicting a gaming machine.

FIG. 2 is a perspective view schematically showing a gaming machine 10. The gaming machine 10 is provided with: a cabinet 11; a top box 12 installed at the upper side of the cabinet 11; and a main door 13 provided on the front face of the cabinet 11. Three reels 14 (14L, 14C, 14R) are rotatably provided inside of the cabinet 11. Symbol arrangement consisting of 22 patterns (hereinafter, referred to as symbols) is drawn on the outer periphery of each of the reels 14.

A lower image display panel 16 is provided in front of each of the reels 14 at a main door 13. The lower image display panel 16 is provided with a transparent liquid crystal display panel on which a variety of images or effect images, etc., pertinent to games are displayed during the play of the games. On the lower image display panel 16, a credit amount display section 31 and a payout number display section 32 are provided. The credit amount display section 31 displays the number of credited coins by way of image. The layout display section 32 displays, by way of image, the number of coins paid out if a predetermined combination of symbols is displayed in a stopped state on a payline L.

On the lower image display panel 16, three display windows 15 (15L, 15C, 15R), which are capable of visually recognizing a rear face of the display panel, are formed, and the symbols drawn on the outer periphery of the reels 14 via the display windows 15 are displayed on a three-by-three symbols basis. On the lower image display panel 16, one payline horizontally crossing the three display windows 15 is formed. The payline L defines a combination of symbols. If a predetermined combination of symbols is displayed in a stopped state on the payline L, the number of coins is paid out according to the combination and the number of inserted coins (BET number).

In the present invention, for example, where a plurality of paylines L horizontally or obliquely crossing the three display windows 15, for example, is formed, the paylines L are activated, the number of which corresponds to that of inserted coins, and then, a predetermined combination of symbols are displayed in a stopped state, coins of which the number corresponds to the predetermined combination may be paid out.

Further, on a front face of the lower image display panel 16, a touch panel 69 is provided, although not shown, so that a player can enter various instructions (pertinent to an insurance-on mode, for example) by operating the touch panel 69.

Downwardly of the lower image display panel 16, a control panel 20 consisting of a plurality of buttons 23 to 27 for entering instructions pertinent to the progress of a game by a player; a coin insertion slot 21 for accepting coins in the cabinet 11; and a bill validator 22 are provided.

On the control panel 20, a SPIN button 23, a CHANGE button 24, a CASHOUT button 25, a 1-BET button 26, and a MAX-BET button 27 are provided. The spin button 23 is intended to input an instruction of starting rotation of the reels 14. The change button 24 is intended for use in asking an attendant of the gaming facility for change. The CASHOUT button 25 is intended to enter an instruction for paying out credited coins to the coin tray 18.

The 1-BET button 26 is intended to enter an instruction for betting one of the credited coins on a game. The MAX-BET button 27 is intended to enter an instruction for betting the maximum number of credited coins (50 coins in the embodiment) that can be betted on one game.

In the present invention, insertion of gaming mediums denotes that gaming mediums are consumed. The gaming mediums are consumed where they are betted on a game and where they are consumed to migrate to an insurance-on mode described later. For example, if the coins inserted into the coin insertion slot 21 are directly betted on a game, the coin insertion into the coin insertion slot 21 is equivalent to gaming medium insertion. As in the present invention, however, if coins are temporarily credited after being inserted into the coin insertion slot 21 and if the credited coins are betted by operating the 1-BET button 26 or the MAX-BET button 27, such betting is equivalent to gaming medium insertion.

The bill validator 22 validates whether or not bills are legitimate and accepts the legitimate bills in the cabinet 11. The bill validator 22 may be constituted so as to enable reading a bar code-attached ticket 39 described later. On the lower front face of the main door 13, i.e., downwardly of the control panel 20, a belly glass 34, on which characters or the like of the gaming machine 10 are drawn, is provided.

On the front face of the top box 12, an upper image display panel 33 is provided. The upper image display panel 33 is provided with a liquid crystal panel, and, for example, images are displayed which is indicative of an introduction to effect images or the contents of games and an explanation of the rules of the games.

On the top box 12, a speaker 29 is provided. At the lower side of the upper image display panel 33, a ticket printer 35, a card reader 36, a data display 37, and a keypad 38 are provided. The ticket printer 35 prints, on tickets, bar codes containing coded data such as credit amount, date and time, or ID numbers of the gaming machine 10, and the bar code-attached tickets 39 are output. A player can cause another gaming machine to read the bar code-attached ticket 39 to perform a game at the gaming machine, or alternatively, can exchange the bar code-attached ticket 39 with bills or the like at predetermined sites of a gaming facility (casher in a casino, for example).

The card reader 36 is intended to read and write data from/into a smart card. The smart card is owned by a player, and stores data for identifying a player or data pertinent to a history of games performed by players, for example. The smart card may store data equivalent to coins, bills, or credits. In place of the smart card, further, a magnetic stripe card may be employed. The data display 37 is made up of a fluorescent display or the like, and stores data read by the card reader 36 or data input by a player via the keypad 38, for example. The keypad 38 is intended for entering the instructions or data pertinent to the issuance of tickets.

FIG. 3 is a schematic view showing arrangement of symbols drawn on the outer periphery of reels 14. 22 symbols are drawn on the outer periphery of each of the left reel 14L, the middle reel 14C, and the right reel 14R. The arrangements of symbols drawn on the reels 14 are different from one another. The arrangements of symbols are formed so that "JACKPOT 7", "BLUE 7", "BELL", "CHERRY", "STRAWBERRY", "PLUM", "ORANGE", and "APPLE" symbols are combined with each other.

As to "JACKPOT 7", "BLUE 7", "BELL", "CHERRY", "STRAWBERRY", "PLUM", "ORANGE", and "APPLE" symbols, if three symbols of a kind are displayed in a stopped state on the payline L, a predetermined amount of credits is added as a credit owned by a player. Further, as to "CHERRY" and "ORANGE", even if one or two of them are displayed in a stopped state on the payline, a predetermined amount of credits is added as a credit owned by the player, according to the displayed number thereof.

"APPLE" is a chance trigger for winning a lottery right in a link game performed when all of the players in groups participate. If three "APPLE" symbols are displayed in a stopped state on the payline L, a player wins only one lottery right in the link game. Information pertinent to the lottery right that each player has won is notified to the control device 200 all times. The control device 200 sums up the number of players (gaming machines 10) who won the lottery right within a specified time (hereinafter, referred to as a lottery right winning period. 30 minutes, for example) and the sequential orders of the players having won the lottery right; performs full lottery in the above sequential orders; and allows each of the gaming machines 10 in groups to establish a link game simultaneously, based upon a result of the lottery.

The arrangement of symbols drawn on each of the reels 14 is downwardly displayed in a scrolling state in the display window 15 together with rotation of the reels 14 when a game is started if the SPIN button 23 is depressed after the 1-BET button 26 of the MAX-BET button 27 has been depressed. After the elapse of the predetermined time, the scrolled symbols are displayed in a stopped state in the display window 15 together with rotation stop of the reels 14. Further, while a variety of winning combinations (see FIG. 15) are predetermined based upon a combination of symbols, when a combination of symbols corresponding to a winning combination is stopped on the payline L, the payout number of coins according to the winning combination is added to the credit owned by the player. When a change trigger is established, information pertinent to the lottery right is notified to the control device 200.

Figure 4:
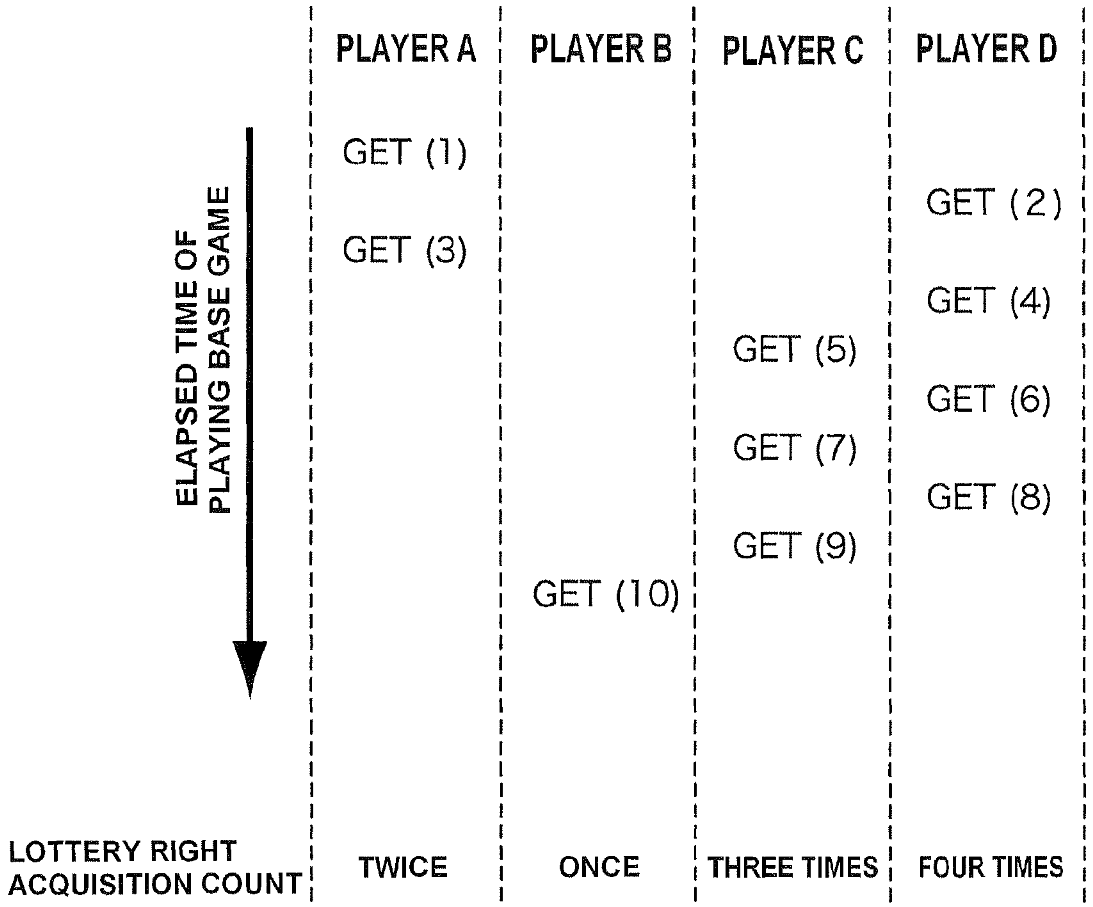
FIG. 4 is an explanatory view of an acquisition state of a lottery right in a link game.

FIG. 4 is an explanatory view of a winning state of the lottery right in a link game. The vertical axis represents an elapsed time of playing a base game in which a payment is made according to symbols displayed in a stopped state on a payline. In the example of FIG. 4, there is shown that, during a specified time (30 minutes), player A has won a lottery right for two times, and in the link game, a lottery is performed in the first and third turns. This is also similar as to another player, player B wins a lottery right for one time, and according to this lottery right, a lottery is performed in the 10.sup.th turn in the link game. Player C wins a lottery right for 3 times, and according to these lottery rights, a lottery is performed in the fifth, seventh, and ninth turns in the link game. Player D wins a lottery right for 4 times, and according to these lottery rights, a lottery is performed in the second, fourth, sixth, and eighth turns in the link game.

Figure 5:
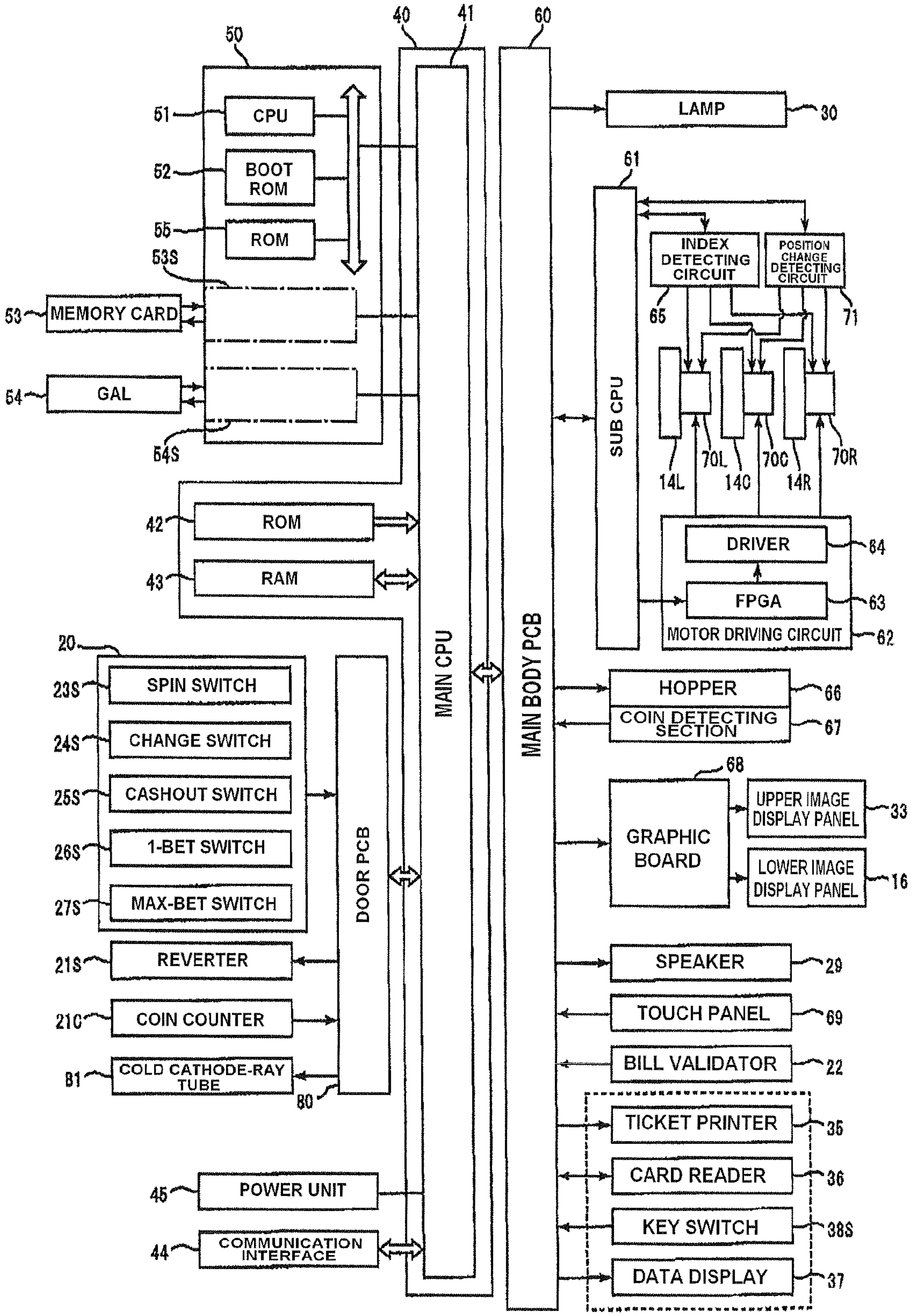
FIG. 5 is a block diagram depicting an interior configuration of the gaming machine.

FIG. 5 is a block diagram depicting an interior configuration of a gaming machine 10. A gaming board 50 is provided with: a CPU (Central Processing Unit) 51 interconnected by means of an internal bus; a ROM 55 and a boot ROM 52; a card slot 53S corresponding to a memory card 53; and an IC socket 54S corresponding to a GAL (General Array Logic) 54.

The memory card 53 is made up of a nonvolatile memory such as Compact Flash (registered trademark), and stores game programs and game system programs. Game programs include a lottery program. The abovementioned lottery program is intended to determine symbols of each of the reels 14 displayed in a stopped state on the payline L (code Nos. corresponding to symbols). The abovementioned program includes symbol-weighted data corresponding to a respective one of plural types of payout rates (80%, 84%, 88%, for example). The symbol-weighted data is indicative of a correspondence between code Nos. of symbols (see FIG. 3) and one or more of the random number values belonging to a predetermined numeric range (0 to 256). The payout rates are determined based upon the payout rate setting data that is output from the GAL 54, and a lottery is performed based upon the symbol-weighted data corresponding to the payout rates.

In addition, a card slot 53S is constituted to enable removable insertion of the memory card 53, and the card slot is connected to a motherboard 40 by means of an IDE bus. Therefore, the memory card 53 is removed from the card slot 53S, other game programs and game system programs are written into the memory card 53, and thereafter, the memory card 53 is inserted into the card slot 53S, thereby making it possible to vary the kinds or contents of the games performed at the gaming machine 10. Further, the memory card 53 storing one group of game programs and game system programs is replaced with that storing another group of game programs and game system programs, thereby making it possible to vary the kinds or contents of the games performed at the gaming machine 10. The game programs include: a program associated with the progress of the play of a game; a program for generating a first special game playing state; and a program for generating a second special game playing state. Further, they also include image data or sound data output during the play of a game and image data or sound data for notifying a transfer to the insurance-on mode.

The GAL 54 is a kind of PLD having an OR-fixed arrayed structure. The GAL 54 is provided with pluralities of IN ports and OUT ports. If predetermined items of data are input to the IN port, the corresponding data is output from the OUT port. The data output from the OUT port is equivalent to the abovementioned payout rate setting data. In addition, an IC socket 54S is constituted so as to removably mount the GAL 54, and is connected to a motherboard 40 by means of a PCI bus. Therefore, the payout rate setting data output from the GAL 54 can be varied by removing the GAL 54 from the IC socket 54S, rewriting the program stored in the GAL 54, and then, mounting the GAL 54 to the IC socket 54S. Further, the GAL 54 is replaced with the replacement GAL 54, thereby making it possible to vary the payout rate setting data.

The CPU51, the ROM55, and the boot ROM52 that were interconnected via the internal bus are connected to the motherboard 40 via a PCI bus. The PCI bus serves to transmit signals between the motherboard 40 and the gaming board 50 and supply power from the motherboard 40 to the gaming board 50. The ROM 55 stores country identification information and an authentication program. The boot ROM 52 stores programs such as a preliminary authentication program and a program (boot code) for the CPU 51 to boot the preliminary authentication program.

The authentication program serves as a program (falsification check program) for authenticating game programs and game system programs. The authentication program is described along verification and certification of the fact that the game programs and game system programs targeted for authentication capturing processing are not falsified, i.e., along the procedures for authenticating the game programs and game system programs (authentication procedures). The preliminary authentication program is intended to authenticate the aforementioned authentication program. The preliminary authentication program is described along certification of the fact that the authentication program targeted for authentication processing is not falsified, i.e., along the procedures for authenticating the authentication program (authentication procedures).

The motherboard 40 is constituted using a commercially available general-purpose motherboard (printed wiring board having packaged therein basic components of a personal computer). This motherboard is provided with a main CPU 41, a ROM (Read Only Memory) 42, a RAM (Random Access Memory) 43, and a communication interface 44. The main CPU 41 serves as a processor of the present invention.

The ROM 42 stores programs and permanent data, such as a BIOS (Basic Input/Output System) which is made up of memory devices such as flash memory and executed by the main CPU 41. If the main CPU 41 executes the BIOS, a process of initializing predetermined peripherals is performed and an acquisition process is started via a gaming board 50 of the game program and game system program stored in the memory card 53. In the present invention, the contents of the ROM 42 may be rewritable or not.

The RAM 43 stores data and programs used when the main CPU 41 is activated. Further, the RAM 43 can store: authentication programs which are read via the gaming board 50; and game programs and game system programs. The RAM 43 stores various signals and information from the control device 200, which were received through the communication interface 44.

The communication interface 44 is for making communication with the control device 200 via a communication line 101. The main CPU 41 transmits to the control device 200, betted-coin information (BET information) and information pertinent to lottery rights won in a base game, for example, together with the game machine identification number of the gaming machine 10. The control device 200 specifies a group to which gaming machines belong, based upon ID numbers (gaming machine ID numbers) assigned thereto. Also, this control device allows a storage mechanism to store betted-coin information and information pertinent to lottery rights won in the base game, etc. in groups.

To the motherboard 40, a main body PCB (Printed Circuit Board) 60 and a door PCB 80, which will be described later, is interconnected by means of a USB. Further, a power unit 45 is connected to the motherboard 40. When power is supplied from the power unit 45 to the motherboard 40, the main CPU 41 of the motherboard 40 is activated. Further, power is supplied to the gaming board 50 via the PCI bus, and thereafter, the CPU 51 is activated.

To the main body 60 and the door PCB 80, equipment or devices, for generating an input signal input to the main CPU 41, and those of which operation is controlled by means of a control signal output from the main CPU 41, are connected. The main CPU 41 executes the game programs and game system programs stored in the RAM 43, based upon an input signal which were input to the main CPU 41, thereby performing predetermined computation to store a result thereof to the RAM 43 or transmit a control signal to equipment or devices in a control process pertinent to equipment or devices.

To the main body PCB 60, a lamp 30, a sub CPU 61, a hopper 66, a coin detecting section 67, a graphic board 68, a speaker 29, a touch panel 69, a bill validator 22, a ticket printer 35, a card reader 36, a key switch 38S, and a data display 37 are connected. The lamp 30 lights in a predetermined pattern, based upon a control signal output from the main CPU 41.

A sub CPU 61 controls rotation and stoppage of reels 14 (14L, 14C, 14R). To the sub CPU 61, a motor driving circuit 62, which is provided with an FPGA (Field Programmable Gate Array) 63 and a driver 64, is connected. The FPGA 63 is an electronic circuit such as a programmable LSI, and functions as a control circuit of stepping motors 70. The driver 64 functions as an amplification circuit for amplifying pulses input to stepping motors 70. Stepping motors 70 (70L, 70C, 70R) for rotating the reels 14 are connected to the motor driving circuit 62. Each of the stepping motors 70 is a stepping motor of 1-2 phase-excitation system.

In the present invention, the excitation system of the stepping motors is not limitative in particular, and for example, a 2-phase excitation system or a 1-phase excitation system can also be employed. Further, a DC motor may be employed in place of the stepping motors. If the DC motor is employed, a deviation counter, a D/A converter, and a servo amplifier are connected to a sub CPU 61 in sequential order, and then, the DC motor is connected to the servo amplifier. The rotational position of the DC motor is detected by means of a rotary encoder, and data concerning the current rotation position of the DC motor is supplied from the rotary encoder to the deviation counter.

To the sub CPU 61, an index detecting circuit 65 and a position detection change circuit 71 are connected. The index detecting circuit 65 serves to detect the position of reels 14 in rotation (index described later), and further, is capable of detecting step-out of the reels 14. Rotation and stoppage control of the reels 14 will be described later in detail with referring to the drawings.

The position change detection circuit 71 detects a change of a stop position of the reels 14 after rotation of the reels 14 has stopped. For example, the position change detection circuit 71 detects a change of the stop position of the reels 14 according to a case, etc., in which a player forcibly changes the stop position so as to realize a winning combination of symbols, in spite of the fact that none of the winning symbol combinations is actually realized. The position change detection circuit 71 is constituted so that the change of the stop position of the reels 14 can be detected by detecting fins (not shown) which were mounted to the inside of the reels 14 at predetermined intervals.

The hopper 66 is installed in a cabinet 11, and a predetermined number of coins are paid out from the coin payout opening 19 to the coin tray 18, based upon the control signal output from the main CPU 41. A coin detecting section 67 is provided inside of the coin payout opening 19, and outputs an input signal to the main CPU 41, if it is detected that a predetermined number of coins have been paid out from the coin payout opening 19.

A graphic board 68 controls the images to be displayed on the upper and lower image display panels 33 and 16, based upon the control signal output from the main CPU 41. The number-of-credits display portion 31 on the lower image display panel 16 displays the number of credits stored in the RAM43. Further, the number-of-payouts display portion 32 on the lower image display panel 16 displays the number of coins to be paid out. The graphic board 68 is provided with: a VDP (Video Display Processor), which generates image data, based upon the control signal output from the main CPU 41; and a video RAM, etc., which temporarily stores image data generated by the VDP. The image data used when the image data is generated by the VDP is read from the memory card 53, and thereafter, the read data is included in the game programs stored in the RAM 43.

The bill validator 22 validates whether or not bills are legitimate and accepts the legitimate bills in the cabinet 11. Upon accepting the legitimate bills, the bill validator 22 outputs an input signal to the main CPU 41, based upon the amount of the bills. The main CPU 41 stores in the RAM 43 the amount of credits responsive to the amount of bills transmitted by the input signal.

The ticket printer 35 prints, on tickets, bar codes containing the coded data such as the credit amount, the date and time, and the ID number of the gaming machine 10, stored in the RAM 43, based upon the control signal output from the main CPU 41, and then, outputs the bar code attached tickets 39. The card reader 36 reads data from a smart card, thereby transmitting the read data to the main CPU 41 or writing data into the smart card, based upon the control signal from the main CPU 41. A key switch 38S is provided on a keypad 38, and when a player operates the key pad 38, a predetermined input signal is output to the main CPU 41. A data display 37 displays data read by a card reader 36 or data input via the keypad 38 by the player, based upon a control signal output from the main CPU 41.

To the door PCB 80, a control panel 20, a reverter 21S, a coin counter 21C, and a cold cathode-ray tube 81 are connected. On the control panel 20, there are provided: a SPIN switch 23S corresponding to the SPIN button 23; a CHANGE switch 24S corresponding to the CHANGE button 24; a CASHOUT switch 25S corresponding to the CASHOUT button 25; a 1-BET switch 26S corresponding to the 1-BET button 26; and a MAX-BET switch 27S corresponding to the MAX-BET button 27. These switches 23S to 27S output input signals to the main CPU 41 when the player operates the corresponding buttons 23 to 27.

The coin counter 21C is provided inside of the coin insertion slot 21, and validates legitimacy of the coins inserted into the coin insertion slot 21 by the player. This coin counter discriminates whether a coin inserted by a player into the coin receiving slot 19 is valid or invalid. Those other than the valid coins are discharged from the coin payout exit 19. The coin counter 21C also outputs an input signal to the main CPU41 if a valid coin is detected.

The reverter 21S is operable based upon the control signal output from the main CPU 41. This reverter distributes, the coins recognized to be legitimate by the coin counter 21C, into a cashbox (not shown) or a hopper 66 which was installed in the gaming machine 10. In other words, if the hopper 66 is filled with coins, the legitimate coins are distributed to the cashbox by means of the reverter 21S. Otherwise, the legitimate coins are distributed to the hopper 66. The cold cathode-ray tube 81 functions as a backlight installed at the rear side of the lower and upper image display panels 16 and 33, and lights based upon the control signal that was output from the main CPU 41.

Figure 6:
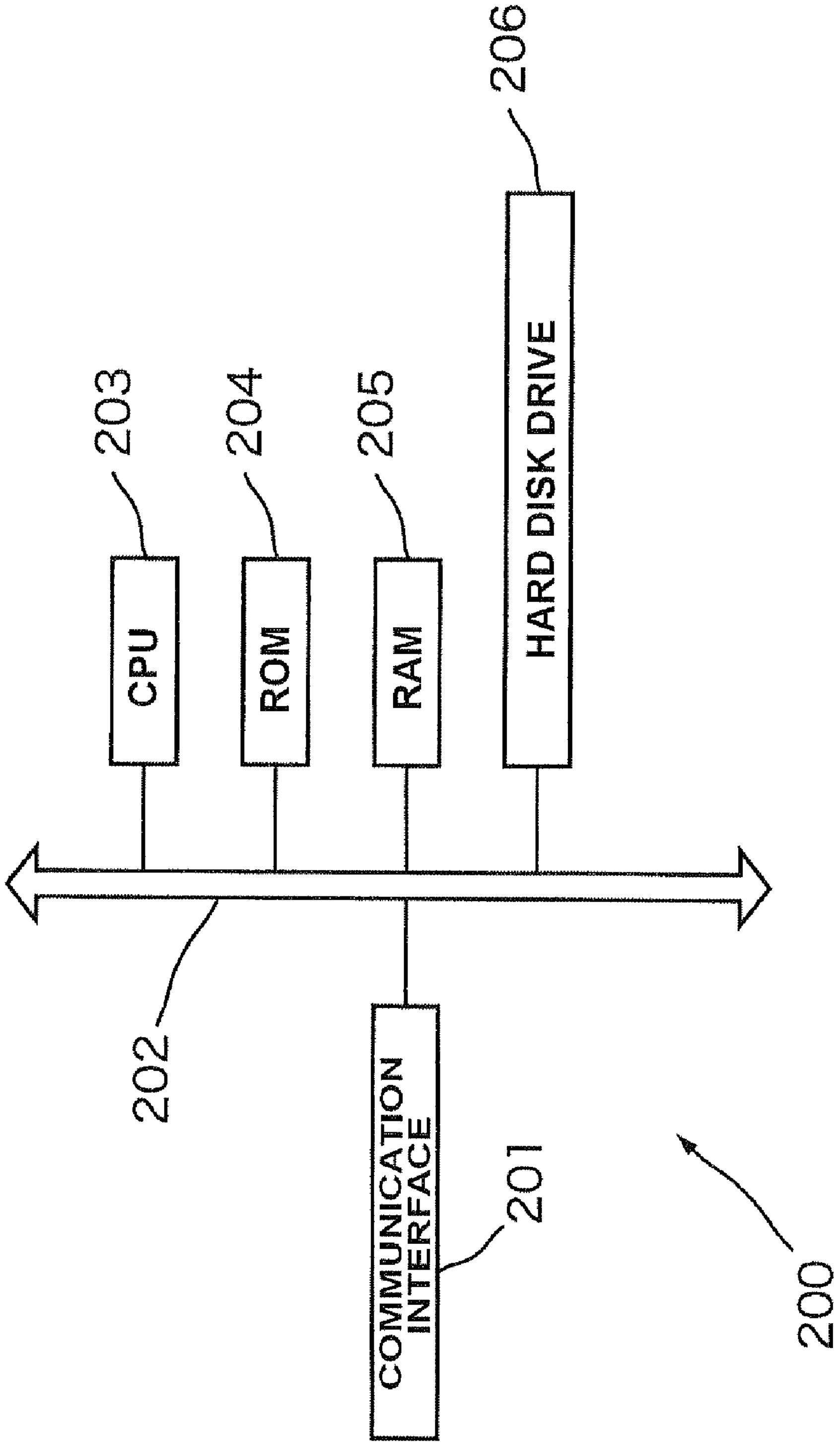
FIG. 6 is a block diagram depicting an interior configuration of a control device.

FIG. 6 is a block diagram depicting an interior configuration of a control device 200. The control device 200 is provided with: a CPU 203 serving as a processor; a ROM 204; a RAM 205 serving as a temporary storage device; a communication interface 201; and a hard disk drive 206. The communication interface 201 is connected to a communication interface 44 of each of the gaming machines 10, via a communication line 101. The ROM 204 stores a system program for controlling an operation of the control device 200 or permanent data or the like. The CPU 203 decompresses to the RAM 205 the system program or the like stored in the ROM 204, and then, executes this system program, thereby controlling hardware components, and functions as the control device of the present invention. The CPU 203 is provided with a built-in counter and a built-in timer (not shown). The RAM 205 temporarily stores the data received from each of the gaming machines 10 or data indicative of a computation result. Further, a hard disk drive 206 stores: a group management table for specifying a group to which the gaming machines 10 belong; and a game playing history in each of the gaming machines 10.

FIG. 7 is a schematic view showing an exemplary group management table included in a control device 200. In the example of FIG. 7, there is shown that: group ID number "01" is assigned to group 1 to which gaming machines 10 corresponding to gaming machine ID numbers "001" to "004" (gaming machines 10A to 10D in the embodiment) belong; and that group ID number "02" is assigned to group 2 to which gaming machines 10 corresponding to gaming machine ID numbers "005" to "008" (gaming machines 10E to 10H in the embodiment) belong. In the example shown in FIG. 7, three-digit numbers and one-digit numbers are employed as gaming ID numbers and group ID numbers, respectively, without being limitative thereto. Further, items of gaming machine and group identification information are not limitative to the abovementioned numbers, and, for example, characters, signs, numbers, and combinations thereof can also be employed.

FIG. 8 is a schematic view showing an exemplary reserved-amount management table. This reserved-amount management table is for managing the reserved amounts of credits as funds for jackpots, and is stored in the RAM 203 of the control device 200. In the example of FIG. 8, there is shown that the current reserved amount of group 1 is 60,000, and the current reserved amount of group 2 is 120,000. In the reserved-amount management table, every time the control device 200 receives information pertinent to betted gaming mediums, which were notified from each of the gaming machines 10, a group to which the gaming machines belong is specified, the received gaming mediums are accumulatively summed to the reserved amount of the group, and the table data is updated.

FIG. 9 is a schematic view explaining a link game establishment flag. The link game establishment flag is indicative of whether or not a link game is established in each of the groups and whether establishment of the link game is standby. Such link game establishment flag is stored in the RAM 203 of the control device 200. In the example of FIG. 9, there is shown that: a link game is established in each of the gaming machines 10A to 10D belonging to group 1; and that establishment of the link game is standby in each of the gaming machines 10E to 10H belonging to group 2. In the gaming medium 10 waiting for establishing a link game as well, a base game is executable.

FIG. 10 is a schematic view showing an exemplary lottery right management table. This lottery right management table stores lottery right winning states in groups, and is stored in the RAM 203 of the control device 200. In the example of FIG. 10, there is shown that players have won the lottery right in group 1 in sequential order of gaming machines 10A, 10D, 10A, 10D, 10C, . . . . Further, there is shown that players have won the lottery right in group 2 in sequential order of gaming machines 10E, 10F, 10H, 10G, 10E, . . . . As the lottery right management table, a table prepared for the group is updated every time the control device 200 receives notification to an extent such that a lottery right has been won in a base game from each of the gaming machines. After the end of the link game, the lottery right management table of the group is cleared.

Figure 11:
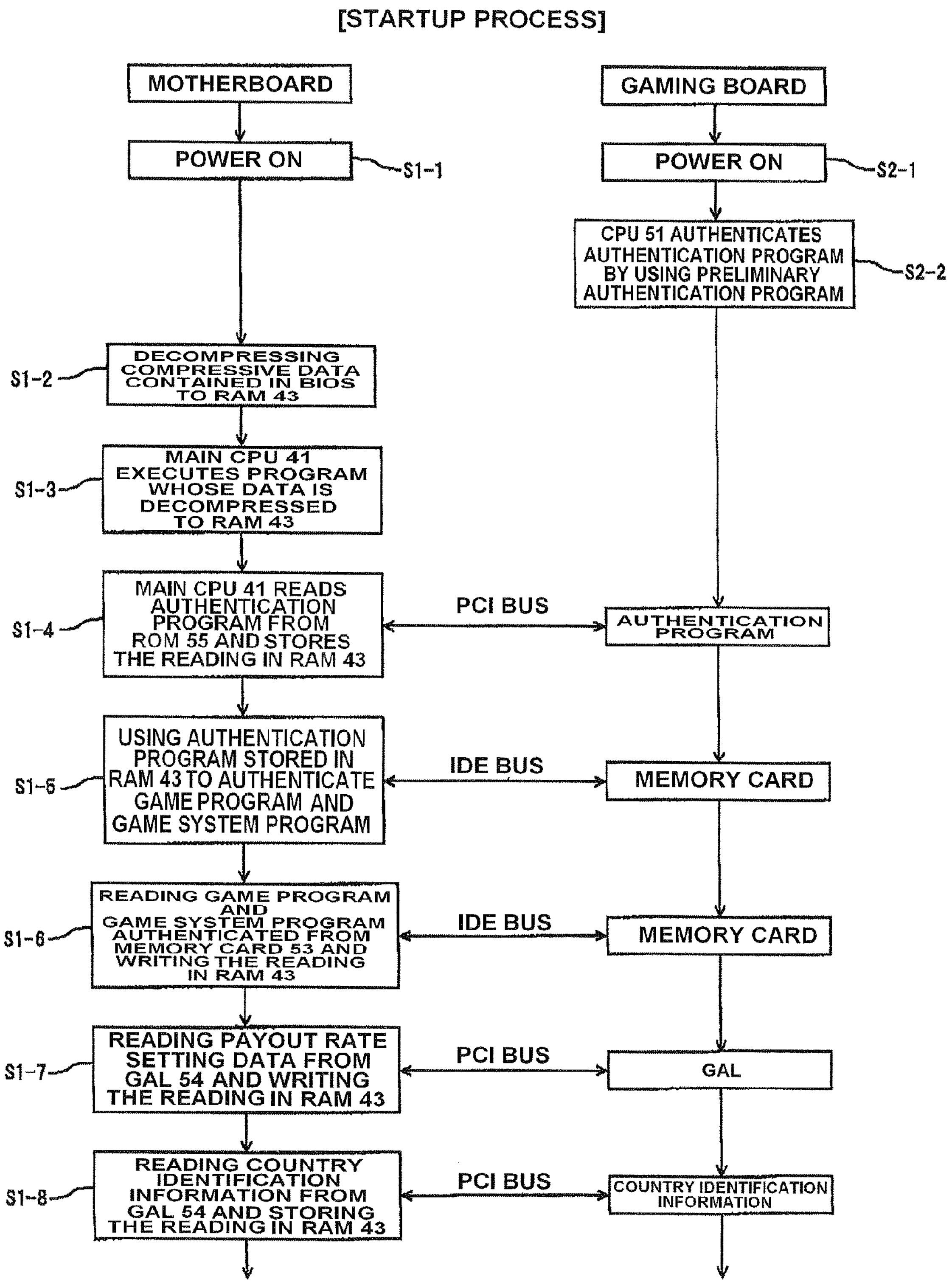
FIG. 11 is a flowchart explaining procedures for performing startup processing in each gaming machine.

FIG. 11 is a flowchart explaining procedures for performing startup processing in each of the gaming machines 10. This flowchart also shows procedures for performing authentication read processing of a game program and a game system program by means of a motherboard 40 and a gaming board 50. A memory card 53 is inserted into a card slot 53S in the gaming board 50, and a GAL 54 is mounted to an IC socket 54S.

When a power switch is turned ON (power is supplied) in a power unit 45, the motherboard 40 and the gaming board 50 are started up (steps S1-1, S2-1). When they are started up, individual processes are performed, respectively. That is, on the gaming board 50, the CPU 51 reads a preliminary authentication program stored in the boot ROM 52. In accordance with the read preliminary authentication program, this CPU performs preliminary authentication to verify and certify in advance that an authentication program is not falsified, before data capturing in the motherboard 40 (step S2-2). On the other hand, on the motherboard 40, the main CPU 41 executes a BIOS stored in the ROM 42, and then, decomposes in the RAM 43 the compressed data incorporated in the BIOS (step S1-2). After that, the main CPU 41 executes the BIOS decompressed in the RAM 43, and diagnoses and initializes various peripheries (step S1-3).

To the main CPU 41, a ROM 55 of the gaming board 50 is connected via a PCI bus. The main CPU 41 performs processing of reading the authentication program stored in the ROM 55 and storing the read authentication program in the RAM 43 (step S1-4). At this time, the main CPU 41 takes a check sum by means of an ADD SUM system (standard check function) in accordance with the standard BIOS functions, and then, causes the RAM 43 to store the authentication program, while performing verification processing of whether or not storing operation is reliably performed without any mistake.

Next, the main CPU 41 accesses the memory card 53 inserted into the card slot 53S via an IDE bus after it is verified what is connected to the IDE bus. After that, this CPU reads the game program and the game system program from the memory card 53. In this case, the main CPU 41 reads data constituting the game program and game system program on a four-by-four bytes basis. Subsequently, in accordance with the authentication program stored in the RAM 43, the main CPU 41 performs authentication to verify and certifies that the read game programs and game system programs are not falsified (steps S1-5). When this authentication processing normally terminates, the main CPU 41 causes the RAM 43 to write and store the (authenticated) game programs and game system programs targeted for authentication (steps S1-6). Next, the main CPU 41 provides an access to the GAL 54 mounted to the IC socket 54S via the PCI bus; reads payout rate setting data; and causes the RAM 43 to write and store the data (steps S1-7). Next, the main CPU 41 performs a process of reading country ID information stored in the ROM 55 of the gaming board 50 and causing the RAM 43 to store the read country ID information (steps S1-8).

After such startup process is performed, the main CPU 41 conducts a game explained below by sequentially reading and executing the game program and the game system program.

Figure 12:
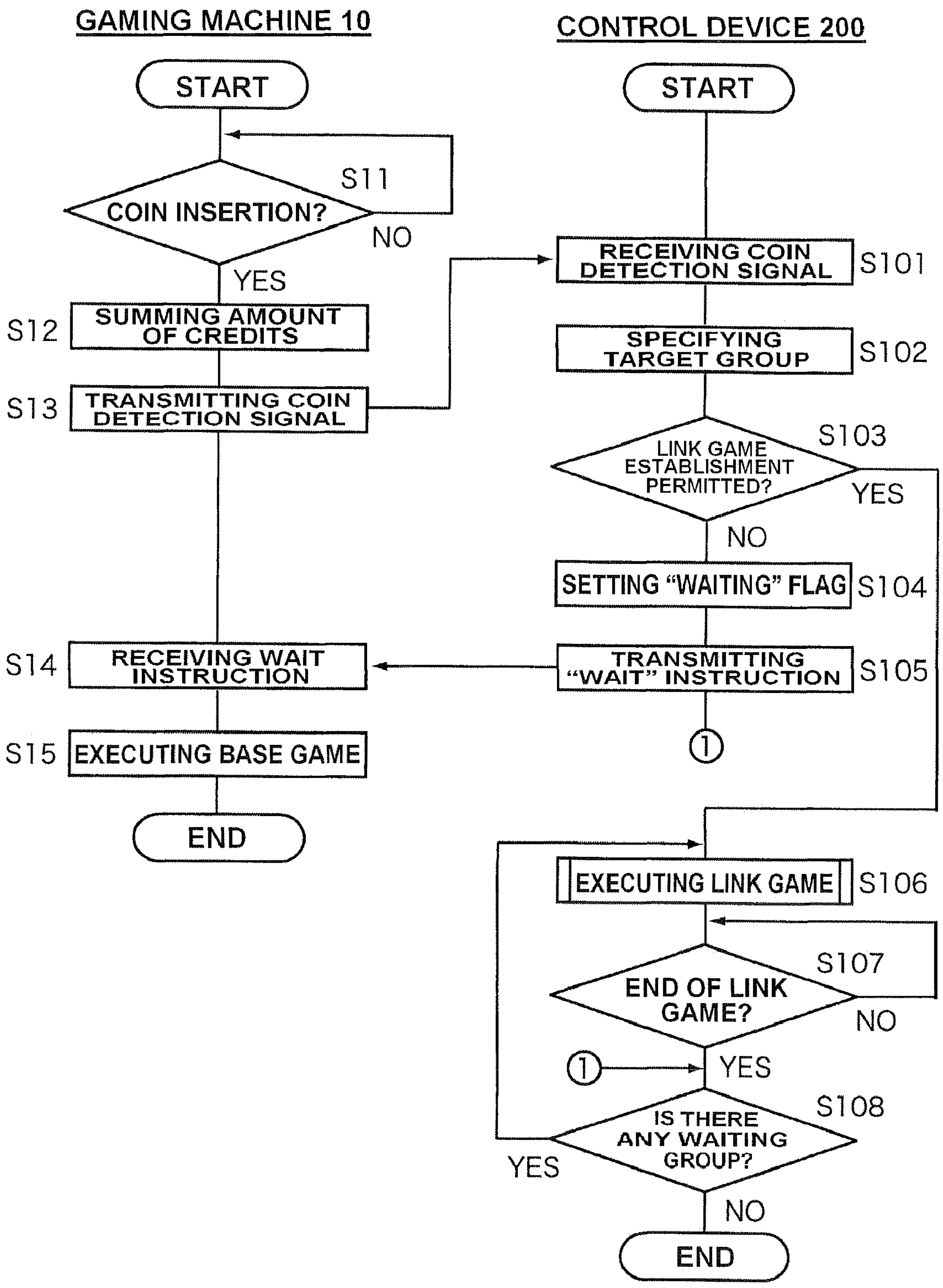
FIG. 12 is a flowchart showing procedures for performing a process of judging whether to establish a link game.

FIG. 12 is a flowchart showing procedures for performing a process of judging whether or not a link game is established. In the gaming machine 10, first, it is judged whether or not coins have been inserted (step S11). Whether or not a coin has been inserted is judged by means of the main CPU 41 of the gaming machine 10. In other words, if a signal output from a coin counter 21C has been input, the main CPU 41 can judge that a coin has been inserted. Where it is judged that no coin has been inserted (S11: NO), the routine is reverted to step S11.

Where it is judged that coins have been inserted (S11: YES), the number of coins counted by the coin counter 21C is added to an amount of credit (step S12). Next, the main CPU 41 transmits a coin detection signal to the control device 200 through the communication interface 44 (step S13).

If the control device 200 has received the coin detection signal transmitted from the gaming machine 10 (step S101), the CPU 203 of the control device 200 references a group management table, based upon a gaming machine identification signal transmitted together with the coin detection signal, and then, specifies a group to which a gaming machine 10 as a transmission source of the coin detection signal belongs (step S102).

Next, the control device 200 judges whether or not to permit establishment of the link game by referencing the link game establishment flag stored in the RAM 205 (step S103). Where it is judged that the link game has been already established in one group, referring to the link game establishment flag, it is judged that the establishment of the link game is not allowed at a present time point as to the group specified at step S102 (step S103: NO), and then, the link game establishment flag about that group is set to "WAITING" (step S104). Then, the CPU 203 of the control device 200 transmits a WAIT instruction through the communication interface 201 to each of the gaming machines 10 belonging to the group specified at step S102 (step S105).

Upon the receipt of the WAIT instruction transmitted from the control device 200 (step S14), the gaming machine 10 executes a base game in response to an operational instruction by a player (step S15), and then, suspends the establishment of the link game.

Where it is judged that the establishment of the link game has been allowed at step S103 (step S103: YES), the control device 200 performs a link game execution process described later (step S106). Next, the CPU 203 of the control device 200 judges whether or not the link game has terminated in the gaming machine 10 (step S107). If the judgment result is negative (S107: NO), the CPU 203 controls the routine to revert to step S107. If the judgment result is affirmative (S107: YES), the CPU 203 judges whether or not a waiting group exists by referring to the link game establishment flag (step S108). Where it is judged that the waiting group exists (S108: YES), the routine is reverted to step S106 at which the link game execution process is performed as to that group (S106). If the judgment result is negative (S108: NO), the processing according to this flowchart is terminated.

Figure 13:
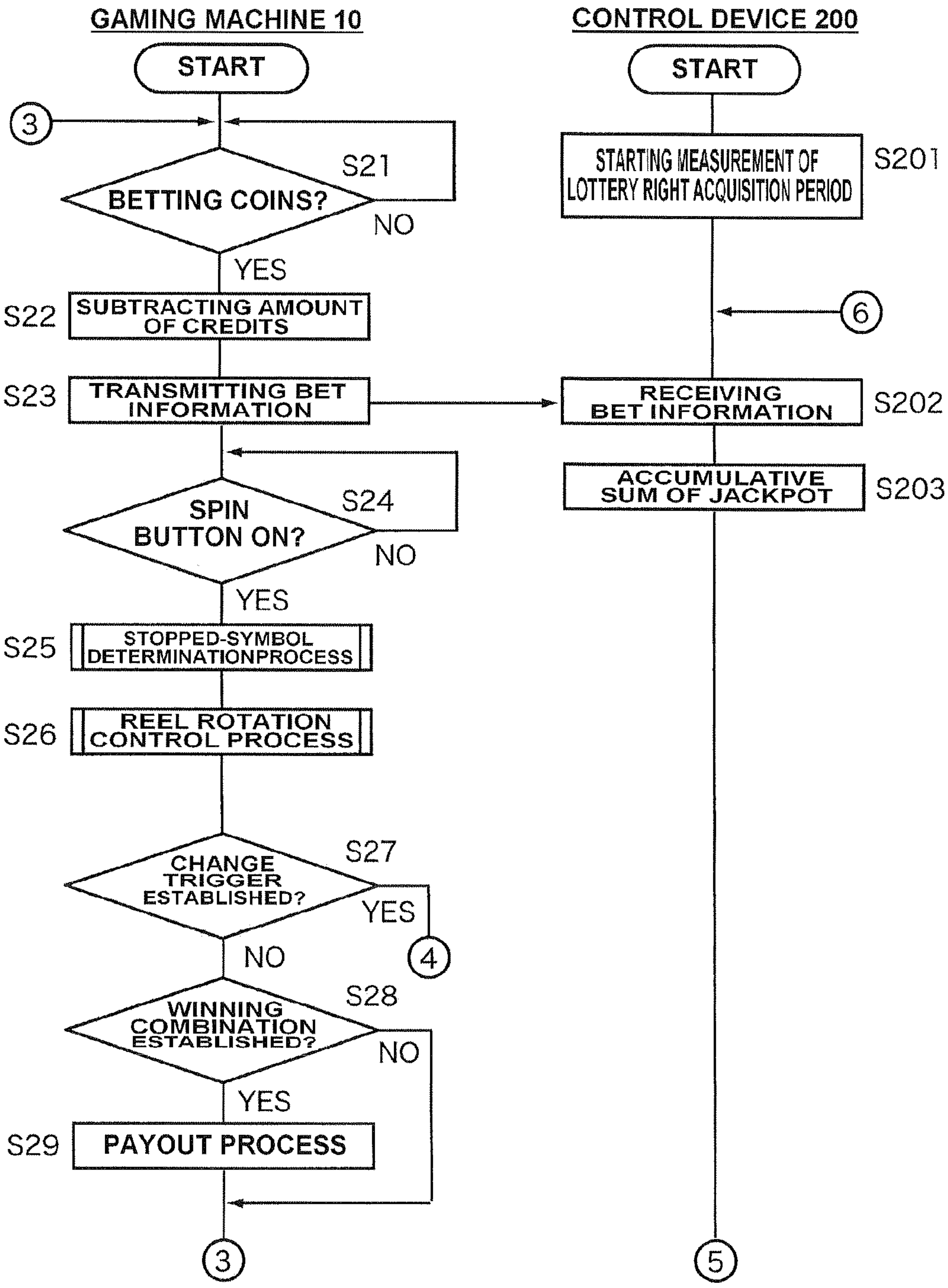
FIG. 13 is a flowchart showing procedures for performing a link game execution process.
Figure 14:
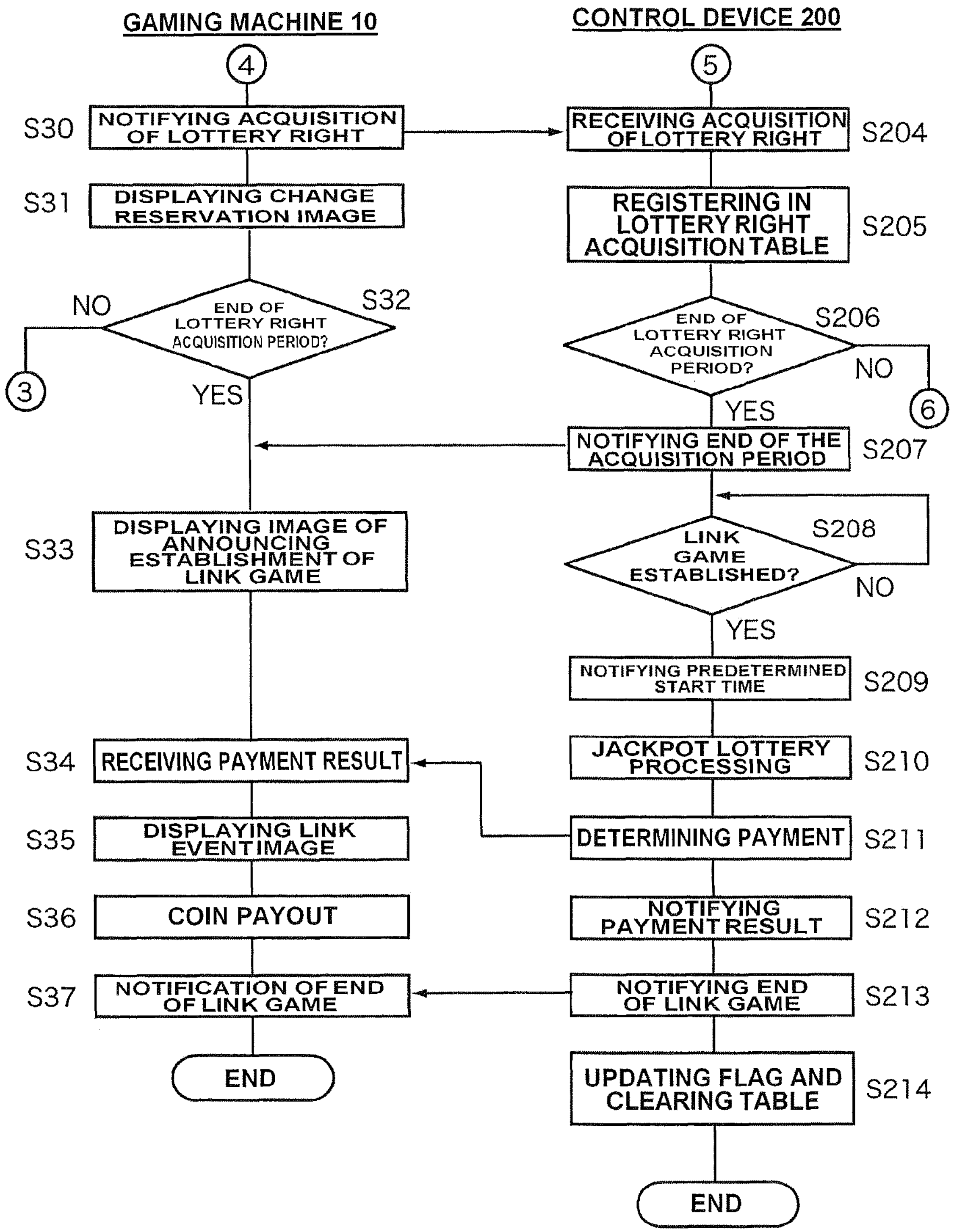
FIG. 14 is a flowchart showing procedures for performing a link game execution process.

FIGS. 13 and 14 are flowcharts showing procedures for performing a link game execution process. Upon starting the link game execution process, the CPU 203 of the control device 200 starts measurement of a lottery right acquisition period with the use of a built-in timer (step S201).

On the other hand, at the gaming machine 10, it is judged whether or not coins have been betted (step S21). In this process, the main CPU 41 judges whether or not an input signal output from a 1-BET switch 26S when a 1-BET button 26 is operated or that output from a MAX-BET switch 27S when a MAX-BET button 27 is operated has been received. Where it is judged that no coins have been betted (S21: NO), the routine is reverted to step S21.

Where it is judged that coins have been betted (S21: YES), the main CPU 41 performs a process of subtracting the amount of credits stored in the RAM 43 in accordance with the number of the betted coins (step S22). If the number of the betted coins is greater than the credit amount stored in the RAM 43, the routine is reverted to step S21 without performing the process of subtracting the credit amount stored in the RAM 43. Further, the gaming machine 10 transmits information pertinent to the betted coins (BET information) to the control device 200. The thus transmitted BET information may be a value of the betted amount of money or may be the number of betted coins. In the present embodiment, some of the betted coins are pooled at the control device 200, and therefore, a pooling rate (for example, 3%) may be predetermined so as to transmit to the control device 200 the value of the amount of money to be pooled.

Upon the receipt of BET information transmitted from the gaming machine 10 (step S202), the control device 200 specifies a group to which the gaming machine 10 as a transmission source of the BET information belongs, and then, accumulatively adds the funds in the jackpots of the specified group (step S203). If the value of the betted amount of money at the gaming machine 10 is received as BET information, a pooling rate (for example, 3%) is predetermined, and then, the CPU 203 computes the amount of money to be pooled. Further, this CPU specifies a group to which the gaming machine 10 as a transmission source of BET information belongs, and then, adds the amount of money computed as the accumulated reserved amount of the specified group.

At the gaming machine 10, after BET information has been transmitted, it is judged whether or not the SPIN button 23 has been set to ON (step S24). In this process, the main CPU 41 judges whether or not the input signal output from the SPIN switch 23S has been received when the SPIN button 23 has been depressed. If the judgment result is negative (step S24: NO), the routine is reverted to step S24. Further, if the SPIN button 23 has not been turned ON (for example, if an instruction has been entered which is indicative of the fact that a game is terminated without the SPIN button 23 being set to ON), the main CPU 41 cancels the subtraction result at step S205.

While the present embodiment describes a case of performing the process of subtracting the amount of credit prior to judging whether or not the SPIN button 23 has been set to ON after coins have been betted, the present invention is not limitative thereto. For example, a process may be performed, of judging whether or not the SPIN button 23 has been set to ON after coins have been betted, and then, subtracting the amount of credit. Where it is judged that the SPIN button 23 has been set to ON.

Upon judging that the SPIN button 23 has been set to ON at step S24 (S24: YES), the main CPU 41 performs a stopped-symbol determination process (step S25). In this stopped-symbol determination process, the main CPU 41 determines code No. at the time of stoppage of each of the reels 14, by executing the stopped-symbol determination program stored in the RAM 43. In this manner, a combination of the symbols to be displayed in a stopped state is determined. A detailed description of the abovementioned process will be given later.

While the present embodiment describes a case of determining one winning combination from among plural kinds of winning combinations by determining a combination of symbols displayed in a stopped state, for example, in the present invention, it may be a routine to determine one winning combination randomly selected from among plural kinds of winning combinations with the use of random number values, and thereafter, determine the combination of the symbols displayed in a stopped state, based upon the abovementioned winning combination.

Next, the main CPU 41 performs a reel rotation control process (step S26). This process is intended to stop rotation of each of the reels 14 so that a combination of symbols, which corresponds to a winning combination determined at step S26, is displayed in a stopped state on a payline L. A detailed description thereof will be given later.

Next, the main CPU 41 judges whether or not a change trigger, which is a lottery right acquisition trigger in a link game, has been established (step S27). While the present embodiment employed a configuration of judging whether or not a chance trigger is established by judging whether or not three "APPLE" symbols have been displayed in a stopped state on the payline L, the establishment of the chance trigger is not limitative thereto. For example, a case in which predetermined double symbols have appeared or a case in which a picture symbol has appeared may be judged as the establishment of the chance trigger.

Upon judging that no chance trigger has been established (S27: NO), the main CPU 41 judges whether or not a winning combination has been established (step S28). In the present embodiment, 11 winning combinations are prepared in addition to the chance trigger. FIG. 15 is an explanatory view of a relationship between plural kinds of winning combinations and the possibility of establishment and payout number of each of the winning combinations, in the present embodiment. The possibility of establishing each of the winning combinations presupposes that a payout rate in a game other than a bonus game is 88%. The possibility of the establishment shown in the figure indicates the possibility that the winning combination is established if code No. of each of the reels 14 is determined, based upon three random number values, with referring to symbol-weighted data. In other words, it does not imply that the random number value is associated with each of the winning combinations.

The possibility of establishment of a chance game trigger is 0.5%. If a player has won a bonus game trigger, three "APPLE" symbols are displayed in a stopped state on the payline, and then, the player wins only one lottery right in a link game.

Further, the possibility of establishment of "JACKPOT 7" is 0.5%. If this winning combination is established, three "JACKPOT 7" symbols are displayed in a stopped state on the payline L, and then, 30 coins are paid out per one coin insertion. As to the possibility of establishment, the lower winning combination is, the more payout number is set. This also applies for other winning combinations, and the possibility of establishment and payout number are preset for each of the winning combinations. However, if any symbol combination other than the winning combinations shown in FIG. 15 is displayed in a stopped state, the player becomes a loser, and no coin is paid out.

Figure 16:
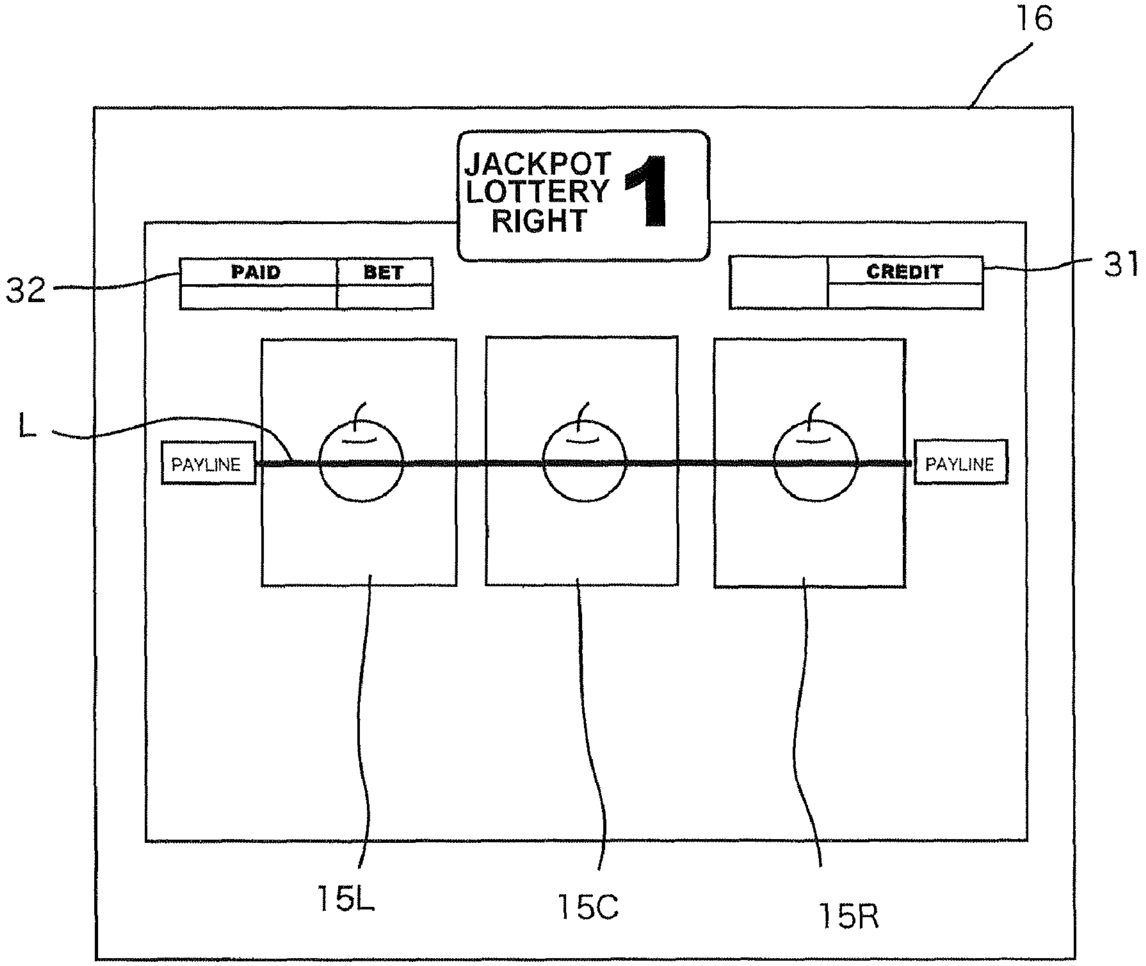
FIG. 16 is a schematic view showing an exemplary chance reservation image.

If any combination other than the chance trigger shown in FIG. 15 is established (S28: YES), the main CPU 41 pays out coins in response to the number of coin insertions and the established winning combination (step S29). After that, the routine is reverted to step S21.

Where it is judged that the chance trigger has been established at step S27 (S27: YES), the gaming machine 10 notifies to the control device 200 the fact that a lottery right has been acquired (step S30), and then, displays a chance reservation image. FIG. 16 is a schematic view showing an exemplary chance reservation image. In the example of FIG. 16, there is shown how the chance reservation image is displayed which is indicative of the fact that only one lottery right has been acquired at the upper side of the lower image display panel 16. Such chance reservation image is stored in the ROM 42 in the gaming machine 10. While, in the present embodiment, the chance reservation image was displayed on the lower image display panel 16, it may be displayed in an enlarged manner on the upper image display panel 33.

Upon receiving from the gaming machine the information that is indicative of the fact that the lottery right has been acquired (step S204), the control device 200 specifies a group to which the gaming machine 10 as a transmission source belongs, based upon the gaming machine ID number to be transmitted together with the received information. After that, this control device registers the gaming machine ID number in the lottery right management table of the corresponding group. In the present embodiment, the gaming machine ID numbers are registered in sequential order of reception of the information indicative of the fact that the lottery right has been acquired. Further, in the embodiment, one gaming machine 10 may acquire a plurality of lottery rights. Furthermore, there may be employed a configuration of acquiring time information obtained when the lottery right of each of the gaming machines 10 is acquired, and thereafter, managing the sequential order of acquisition of the lottery rights in accordance with the acquired time information.

Next, the CPU 203 of the control device 200 judges whether or not the lottery right acquisition period has expired by judging whether or not a predetermined time has elapsed after starting measurement at step S201 (step S206). Where the judgment result is negative (S206: NO), the routine is reverted to step S202, and where the judgment result is affirmative (S206: YES), the fact that the lottery right acquisition period has expired is notified to the gaming machine (step S207).

On the other hand, in the gaming machine 10 as well, it is judged whether or not the lottery right acquisition period has expired by judging whether or not information has been received which is indicative of the fact that the period has expired. If the judgment result is negative (S32: NO), the routine is reverted to step S21.

The control device 200 judges whether or not to establish a link game after notifying to the gaming machine 10 the fact that the lottery right acquisition period has expired (step S208). The link game is established with a timing arbitrarily determined by the control device 200. For example, the time of the establishment may be predetermined. After the gaming machine 10 has been started up, this link game may be established periodically (for example, every 30 minutes). In addition, the link game may be established after a predetermined period of time (for example, one minute) has elapsed after the end of the lottery right acquisition period. Further, it may be established with a timing randomly determined using random numbers or the like. Where it is judged that no link game is established (S208: NO), the routine is reverted to step S208. Alternatively, where it is judged that the link game is established (S208: YES), a predetermined time of the establishment is set in order to allow the gaming machine 10 to display an image of announcing the establishment of the link game, and thereafter, the set predetermined time of the establishment is notified to the gaming machine 10 (step S209).

Figure 17:
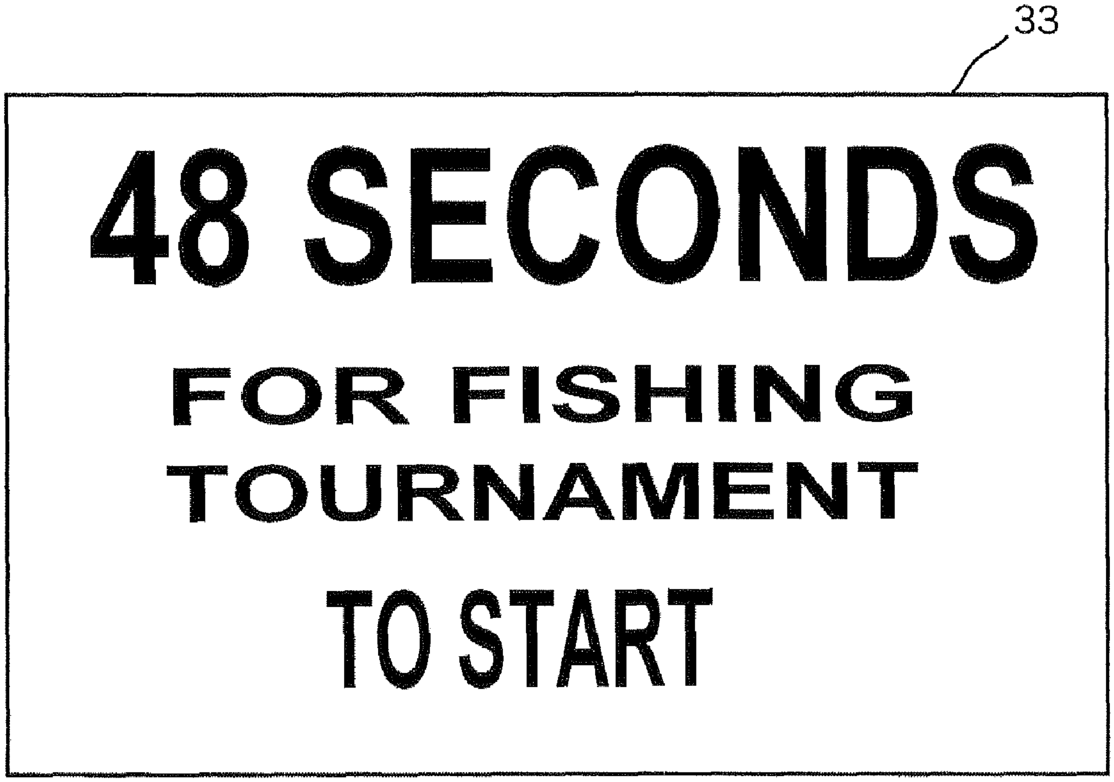
FIG. 17 is a schematic view showing an exemplary image of announcement of the establishment.
Figure 18:
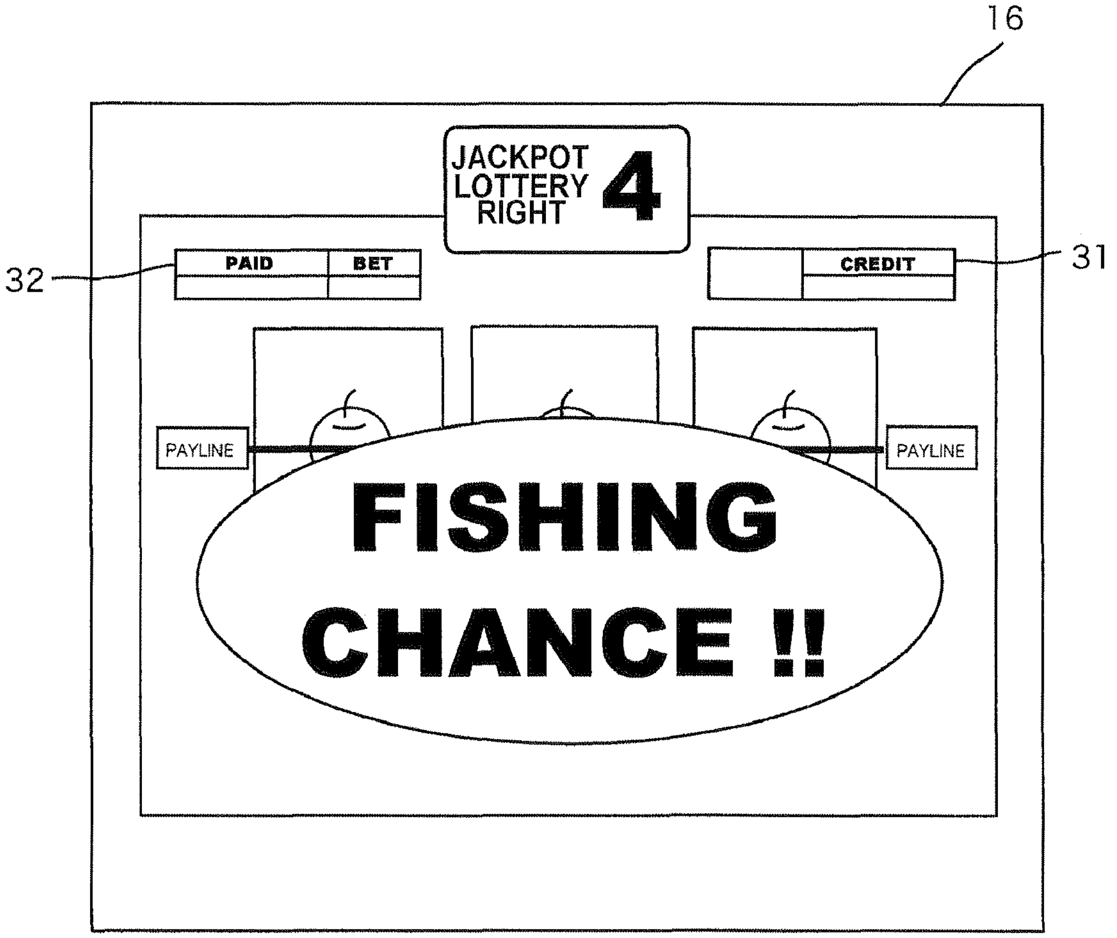
FIG. 18 is a schematic view showing an exemplary guide image displayed on a lower image display panel when a predetermined time of the establishment has been reached.

After the lottery right acquisition period has expired (S32: YES), if the predetermined time of the establishment is received from the control device 200, the image of announcing the establishment of the link game is displayed on the upper image display panel 33 (step S33). FIG. 17 is a schematic view showing an exemplary image of announcing the establishment of the link game. The image of announcing the establishment of the link game shown in the figure indicates time remaining until the link game (virtual fishing tournament) is started. In this case, the image of announcing the establishment of the link game is updated every one second. Such change reservation image is stored in the ROM 42 incorporated in the gaming machine 10. The schematic view of FIG. 18 shows an exemplary guide image displayed on the lower image display panel 16 when the predetermined time of the establishment has been reached.

Incidentally, the control device 200 internally performs a jackpot lottery process (step S210). In the embodiment, this control device performs a process of selecting any one of four types of jackpots "GRAND", "MAJOR", "MINOR", and "MINI", with the use of random number values. At this time, the above control device sequentially executes processes of selecting any one of four types of jackpots "GRAND", "MAJOR", "MINOR", and "MINI", in accordance with the ranking in groups included in the lottery right management table shown in FIG. 10. After that, upon receipt of the result of the jackpot lottery process at step S210, the control device determines a payment to each of the gaming machines 10 in the groups (step S211), and thereafter, notifies the determined payment (payment result) to each of the gaming machines 10 (step S212).

Figure 19:
FIG. 19 is a schematic view showing an exemplary image displayed if a player has won a MAJOR jackpot.

Upon receipt of the payment result notified from the control device 200 (step S34), each of the gaming machines 10 in the groups displays an effect image (event image) indicative of the fact that an animation character defined for each of the gaming machines 10 is enjoying fishing (step S35). At this time, the scale of payment is reflected on the sizes or number of caught fishes, thereby enhancing the players' anticipation and excitement. The schematic view of FIG. 19 shows an exemplary image displayed if a player has won a MAJOR jackpot. After that, coins are paid out according to the payment result notified from the control device 200 (step S36). If coins are reserved, the main CPU 41 performs a process of summing the amount of credits stored in the RAM 43. Alternatively, if coins are paid out, the main CPU 41 transmits a control signal to a hopper 66 and pays out a predetermined number of coins. At that time, a coin detecting section 67 counts the number of coins paid out from the hopper 66, and then, transmits a payout completion signal to the main CPU 41 when the counted value reached a specified number. In this manner, the main CPU 41 stops driving the hopper 66, and then, terminates coin payout processing. After coin payout has terminated, the end of the link game is notified (step S37).

Upon receipt of the notification of the end of the link game from the gaming machine 10 (step S213), the control device 200 updates the link game establishment flag and clears the lottery right management table (step S214).

Figure 20:
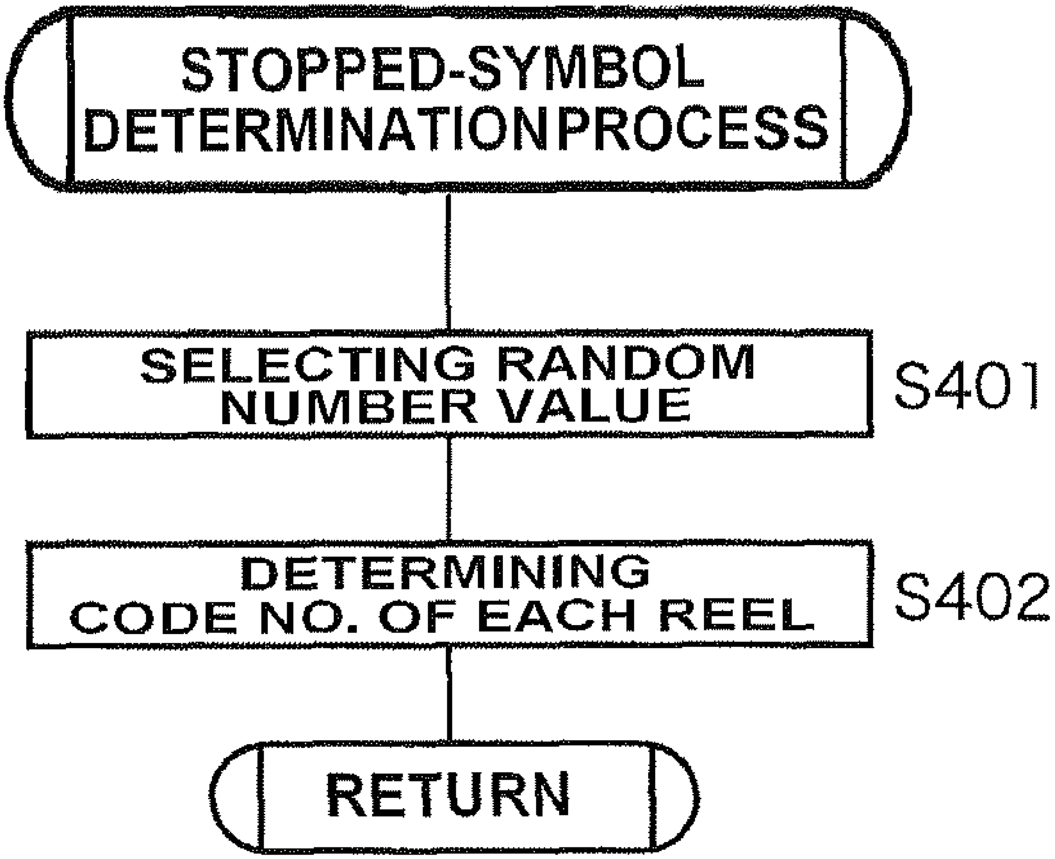
FIG. 20 is a flowchart showing procedures for determining symbols to be stopped.

Next, a stopped-symbol determination process which is invoked at step S25 in the subroutine shown in FIG. 13 will be described. FIG. 20 is a flowchart showing procedures for determining symbols to be stopped. This process is performed by the main CPU 41 executing the stopped-symbol determination program stored in the RAM 43. First, the main CPU 41 selects the random number values corresponding to each of the three reels 14, from among the numeric range of 0 to 255, by executing the random number generating program included in the stopped-symbol determination programs (step S401). The present embodiment describes a case of generating random numbers in a programmable fashion (a case of using so called software random numbers). In the present invention, however, a random number generator is provided, whereby random numbers may be sampled from the random number generator (so called hardware random numbers may be used).

Next, the main CPU 41 (processor) refers to symbol-weighted data according to the payout rate setting data that is output from the GAL 54 and stored in the RAM 43 (storage device), and then, determines code No. (see FIG. 3) of each of the reels 14, based upon the selected three random number values (step S402). Code Nos. of the reels 14 correspond to those of symbols displayed in a stopped state on the payline L. A reel rotation control process described later is performed based upon code No. of each of the reels.

Figure 21:
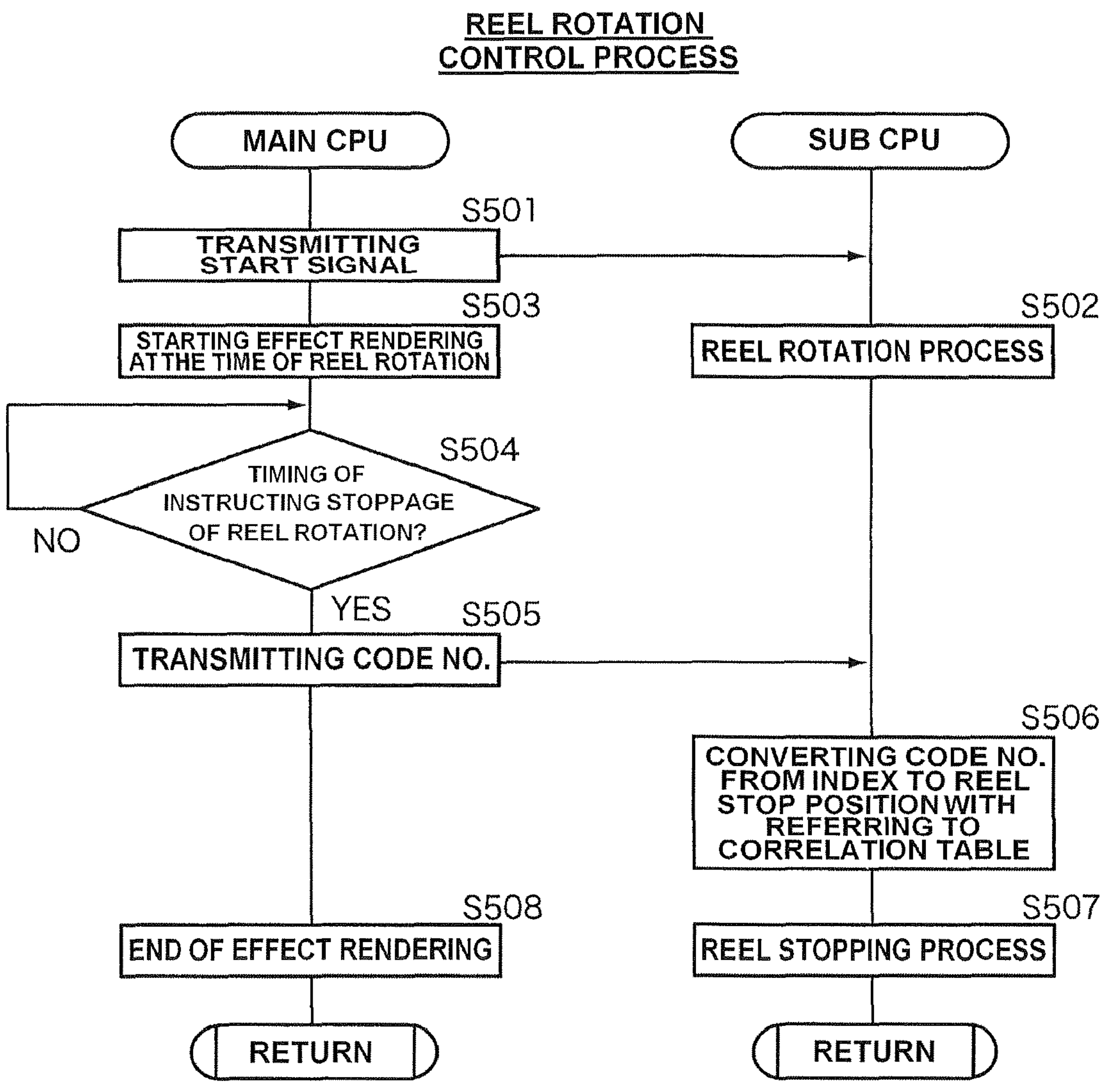
FIG. 21 is a flowchart showing procedures for executing reel rotation control processing.

Next, a reel rotation control process which is invoked at step S26 in the subroutine shown in FIG. 13 will be described. FIG. 21 is a flowchart showing procedures for executing reel rotation control processing. This process is performed between the main CPU 41 and a sub CPU 61.

First, the main CPU 41 transmits to the sub CPU 61 a start signal for storing reel rotation (step S501). Upon the receipt of the start signal from the main CPU 41, the sub CPU 61 performs reel rotation processing (step S502). In this process, the sub CPU 61 supplies pulses to a motor driving circuit 62. The pulses output from the sub CPU 61 are amplified by means of a driver 64, and thereafter, the amplified pulses are supplied to stepping motors 70 (70L, 70C, 70R). As a result thereof, each of the stepping motors 70 rotates, and concurrently, each of the reels 14 (14L, 14C, 14R) rotates. The stepping motor 70 of the 1-2 phase excitation system is 0.9 degrees in stepping angle, and the number of steps per rotation is 400. Therefore, if 400 pulses are supplied to the stepping motors 70, the reels 14 makes one rotation.

At the time of starting rotation of the reels 14, the sub CPU 206 supplies pulses with low frequencies to the motor driving circuit 62 and gradually increases the frequencies of the pulses. Concurrently, the rotation speed of each of the reels 14 increases. When a predetermined time has elapsed, the frequencies of the pulses are made uniform. As a result thereof, each of the reels 14 rotates at a constant speed.

Figure 22A:
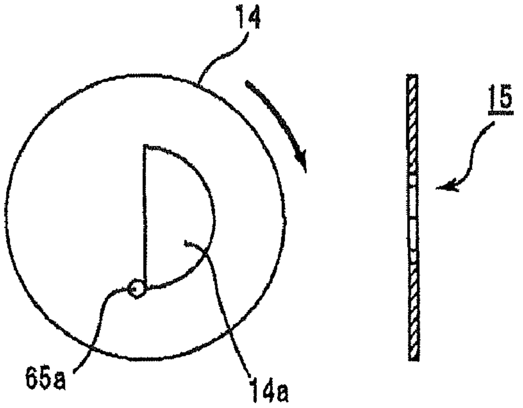
FIGS. 22A, 22B, 22C and 22D are explanatory side views of rotating operation of reels.
Figure 22B:
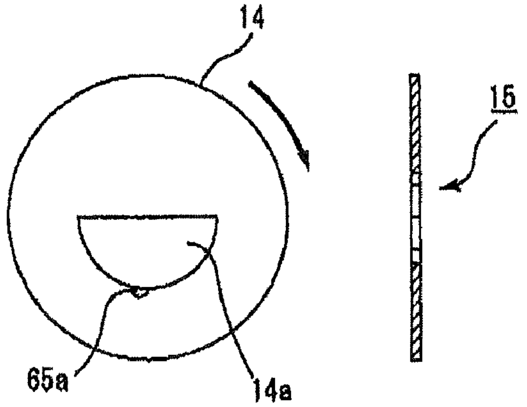

Now, a rotating operation of the reels 14 will be described, referring to FIGS. 22A and 22B. These figures are explanatory side views of the rotation operation of the reels 14. As shown in FIG. 22A, a semi-circular metal plate 14*a* is provided on the side face of each of the reels 14. The metal plate 14*a* rotates with the reels 14. Further, 22 symbols are provided on the peripheral faces of the reels 14. Three of the 22 symbols drawn on the peripheral faces of the reels 14 can be visually recognized via a display window 15 formed in front of the reels 14. In the figure, the heavily-lined arrows indicate the rotational directions of the reels 14. Further, a proximity sensor 65*a* is provided laterally of the reels 14. The proximity sensor 65*a* is for detecting the metal plate 14*a*. The proximity sensor 65*a* neither moves nor rotates, even if each of the reels 14 rotates.

Figure 22C:
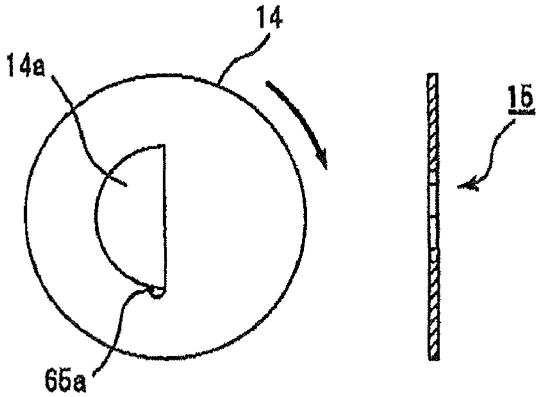

FIG. 22A shows a position (hereinafter, referred to as position A) of the metal plate 14*a* when the metal plate 14*a* is about to be detected by means of the proximity sensor 65*a*. If the reels 14 rotate when the metal plate 14*a* is set at position A, the metal plate 14*a* moves to the position shown in FIG. 22B. In the figure, there is shown a position (hereinafter, referred to as position B) of the metal plate 14*a* when the metal plate 14*a* is detected by means of the proximity sensor 65*a*. If the reels 14 rotate when the metal plate 14*a* is set at position B, the metal plate 14*a* moves to the position shown in FIG. 22C. In the figure, there is shown a position (hereinafter, referred to as position C) of the metal plate 14*a* when the metal plate 14*a* is not detected by means of the proximity sensor 65*a*.

Figure 22D:
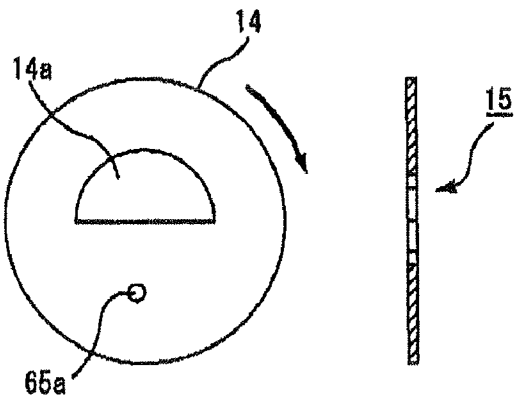

If the reels 14 rotate when the metal plate 14*a* is set at position C, the metal plate 14*a* moves to the position shown in FIG. 22D. In the figure, there is shown a position (hereinafter, referred to as position D) of the metal plate 14*a* when the metal plate 14*a* is not detected by means of the proximity sensor 65*a*. If the reels 14 further rotate, the metal plate 14*a* reverts to the position A. As described above, the plate 14*a* is sequentially shifted to positions A, B, C, D, and then, to A, together with rotation of the reels 14.

The proximity sensor 65*a* constitutes an index detection circuit 65 (see FIG. 5). Assuming that a state in which the proximity sensor 65*a* is detecting the metal plate 14*a* is established at "High" and a state in which such detection is not being performed is established at "Low", when the metal plate 14*a* is shifted to the positions C, D, and then, to A, the state of the index detection circuit 65 is established at "Low". The sub CPU 61 recognizes the rotational position of each of the reels 14 while a rising edge from "Low" to "High" is defined as an index (origin) 1 and a falling edge from "High" to "Low" is defined as an index (origin) 2.

The main CPU 40 executes an effect at the time of reel rotation after transmitting a start signal to the sub CPU 61 at step S40 (step S503). This process is intended to display an image on the lower image display panel 16 or outputs a sound from the speaker 29, over a period (3 seconds, for example) which is defined responsive to a result, etc. of the abovementioned stopped-symbol determination processing.

Next, the main CPU 40 judges whether or not a timing of instructing rotation stop of the reels 14 is established (step S504). The timing of instructing rotational stop of the reels 14 is a timing which is earlier than usual by time intervals minimally required to stop rotation of the reels 14 from a time point of terminating effect rendering at the time of reel rotation. The time minimally required to stop the rotation of the reels 14 is predetermined.

If the judgment result at step S504 is negative (S504: NO), the routine restarts from the same step at which the effect at the time of rotation of reels 14 rotation is continuously provided. If the result is affirmative (S504: YES), the main CPU 41 transmits, to the sub CPU 61, code Nos. of the reels which were stored in the RAM 43 (step S505). Upon the receipt of code Nos. of reels from the main CPU 41, the sub CPU 61 converts the code Nos. to the stop positions of reels from index (step Nos.), based upon a correlation table between the number of steps and code Nos. stored in the ROM (not shown) included in the sub CPU 61 (step S506).

FIG. 23 is a schematic view showing a correlation table between the number of steps and code Nos. For code Nos., the corresponding indexes and the number of steps are associated with each other. Code Nos. correspond to the symbols drawn on the outer periphery of reels 14, and the symbols of code Nos. "00" to "10" correspond to index 1, and those of code Nos. The symbols of code Nos. 11 to 21 correspond to index 2. Further, the number of steps in the correlation table shown in FIG. 18 is determined while index 1 is defined as a reference. For example, if code No. is "08", 145 steps from index 1 are equivalent to reel stop positions. Further, if code No. is "12", 218 steps from index 1 are equivalent to reel stop positions.

Next, the sub CPU 61 executes reel stop processing (step S507). In this process, the sub CPU 61 detects, for each of the reels 14, a rising edge (index 1) from "Low" to "High" in the index detection circuit 65. Then, this sub CPU supplies to the motor driving circuit 65 the pulses which are equivalent to the number of steps converted from code Nos. at step S52, with a timing with which index 1 was detected. After that, the sub CPU stops supplying pulses.

For example, at step S506, where the reel stop position is determined to be 145 steps from index 1, the sub CPU 61 supplies 145 pulses to the motor driving circuit 65 with the timing with which index 1 was detected. After that, this sub CPU stops supplying pulses. Further, at step S52, where the reel stop position is determined to be 21 steps from index 1, the sub CPU 61 supplies 218 pulses to the motor driving circuit 65, with the timing with which index 1 was detected. As a result thereof, the reels 14 stop as per code Nos. determined at step S402 of FIG. 15, and thereafter, a combination of symbols corresponding to the winning combination determined at step S402 of FIG. 15 is displayed in a stopped state. On the other hand, the main CPU 41 terminates effect rendering performed at the time of reel rotation (step S508). After terminating the process at steps S507 and S508, the main CPU 41 terminates this process.

Where the index corresponding to code No., that is transmitted at step S505, is different from that detected by means of the index detection circuit 65 when rotation of the reels 14 has stopped, step-out of the reels 14 arises. Thus, the main CPU 41 performs a process of displaying an error message on the lower image display panel 16, and then, cancels a game, for example. For example, this CPU cancels a game, where index 1 is detected by means of the index detection circuit 65 when rotation of the reel 14L has stopped in spite of the fact that the processing of stopping the reel 14L with code No. 12 corresponding to index 2 was performed.

As described above, in the embodiment, the control device 200 is capable of managing information pertinent to reservation in groups in all. Therefore, information pertinent to a group having reserved the largest amount of funds therein is broadcasted to the surrounding spectators or the like, for example, whereby the spectators' attention is focused on that group, leading to the liveliness of gaming facility. Further, it is expected that players who are playing games at the gaming machines 10 execute more base games in seeking to attract the spectators' attention. Therefore, it is possible to prompt the players to bet gaming mediums and to increase the profits of the play of games at the gaming facility.

The link game is not always performed and is occasionally performed with a timing that the control device arbitrarily determined. Thus, if control devices, which perform processing pertinent to the link game, are incorporated in game machines or in groups, the availability of each of the control devices is very low, resulting in a wasteful system configuration. In the gaming machine of the present invention, after a timing of starting a link game has been adjusted in groups, in a state in which a link game is executed in one group, if a timing of executing a link game in another group is established, the execution of the link game in such another group is postponed. Therefore, one control device can execute processes pertinent to link games performed in a plurality of groups. As a result thereof, the availability of the control device can be increased, and hardware resources can be efficiently utilized.

While, in the embodiment, a fishing game was performed as an exemplary link game (common game), of course, the present invention is not limitative thereto. For example, a card game such as poker or any other game such as a shooting game or a martial art game may be performed. At this time, these games may be performed only once, or alternatively, may be repeatedly performed over a plurality of times. Further, the games conducted by operational instructions from players may be employed.

While the present embodiment described a case of using the mechanical reels 14, the present invention may be constituted so that symbols are displayed on a liquid crystal display device, etc. in place of the mechanical reels 14.

Second Embodiment

While, in the first embodiment, the control device 200 was constituted to have functions of: managing reservations as funds for link games in groups; managing the lottery right in the link game acquired by each of the gaming machines 10; controlling establishment of the link game in groups; and determining a payment in the link game, based upon the lottery right acquired by each of the gaming machines 10, a configuration may be employed such that common display devices for displaying information and images shared by a plurality of gaming machines (for example, by four gaming machines) are installed, and thereafter, one of the common display devices has the aforementioned functions.

Figure 24:
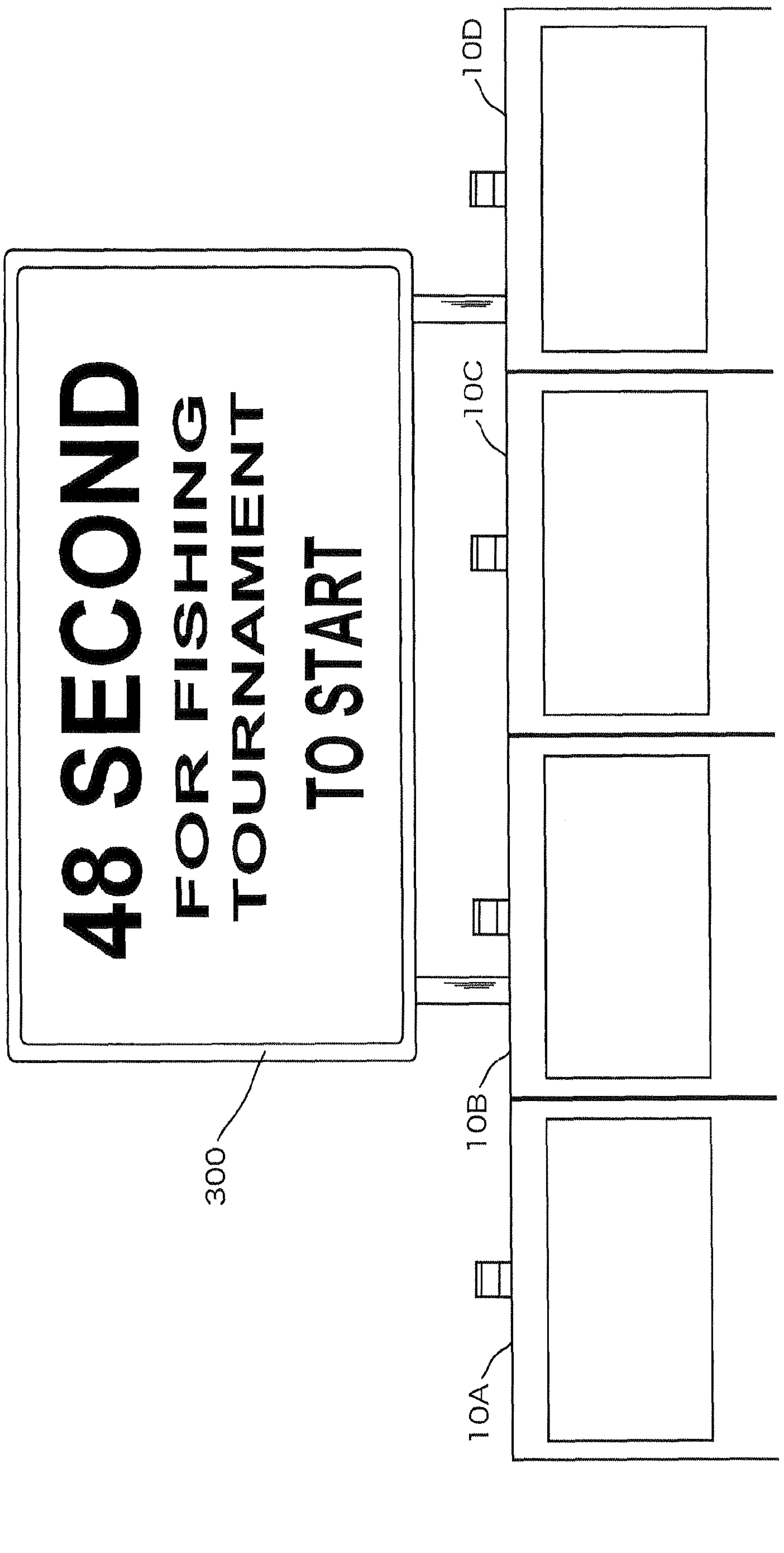
FIG. 24 is a schematic view showing a configuration of a gaming system according to the present embodiment.

FIG. 24 is a schematic view showing a configuration of a gaming system according to the present embodiment. The gaming system according to the embodiment is provided with: four gaming machines A to D; and a common display device 300 connected thereto. These four gaming machines 10A to 10D are integrally concatenated with each other, and the common display device 300 is supported by a column provided at the rear side of the gaming machines 10A to 10D. Such gaming system may be constructed in one gaming facility such as a bar or a casino in which players can enjoy a variety of games, or alternatively, may be constructed among a plurality of gaming facilities. The gaming system 1 may be constructed in one gaming facility on a floor-by-floor basis or on a section-by-section basis in the gaming facility.

Figure 25:
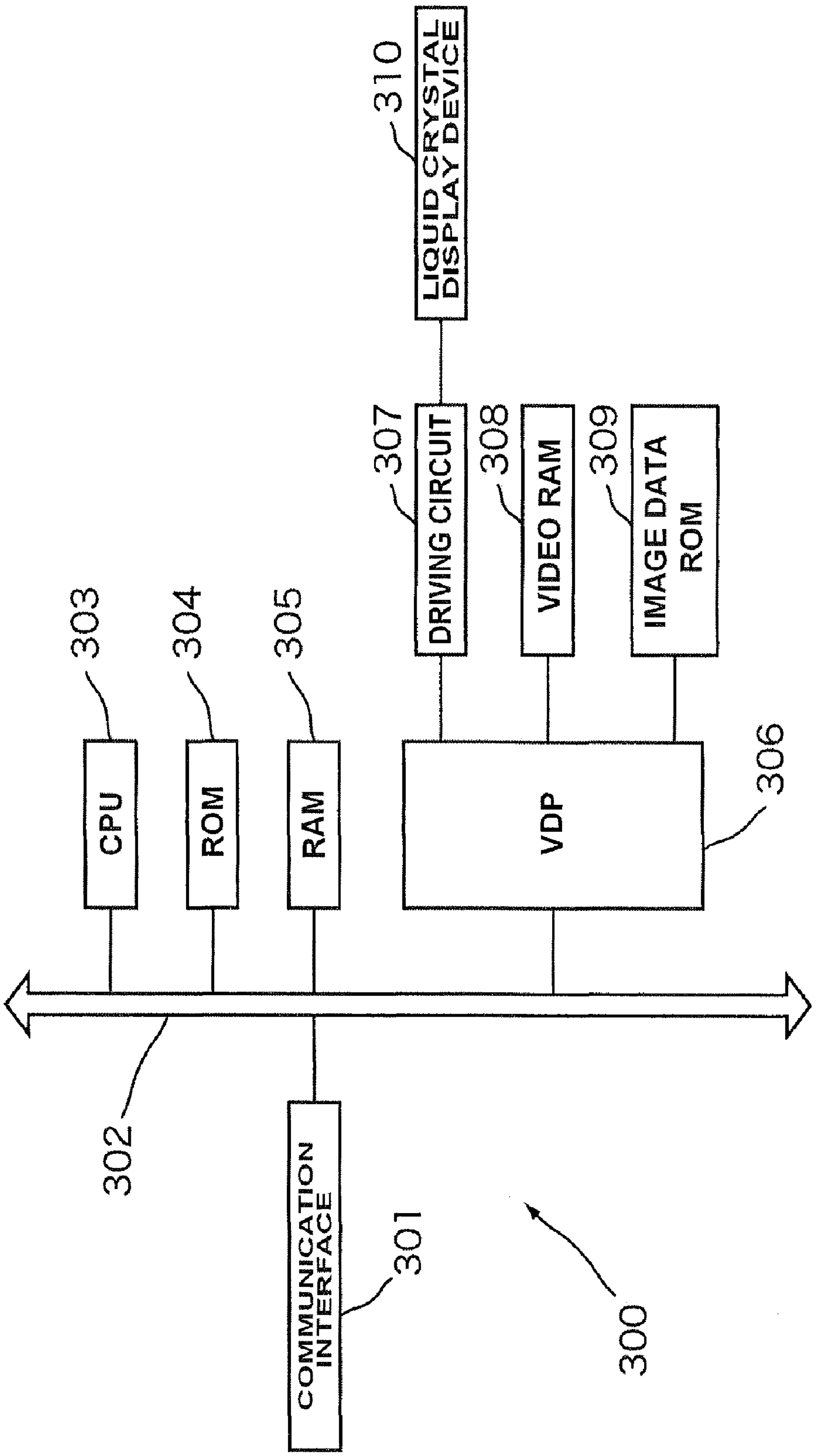
FIG. 25 is a block diagram depicting an interior configuration of a common display device.

FIG. 25 is a block diagram depicting an interior configuration of a common display device 300. The common display device 300 is connected to four gaming machines 10 in the embodiment, and is commonly used by each of the connected gaming machines 10. The common display device 300 is provided with: a communication interface 301; an input/output bus 302; a CPU 303; a ROM 304; a RAM 305; a VDC 306; a driving circuit 307; a video RAM 308; an image data ROM 309; and a liquid crystal display panel 310.

The communication interface 301 is intended for receiving signals or data, etc., which were transmitted from each of the gaming machines 10, and for transmitting required signals or data, etc., to each of the gaming machines 10. The signals or data that were received at the communication interface 301 are notified to the CPU 302 via an input/output bus 303.

The ROM 304 stores a display control program for generating a drive signal to be supplied to the liquid crystal display panel 310, based upon an image display command issued by the CPU 303. On the other hand, the RAM 305 stores the values of flags or variables used in the aforementioned control program.

The VDP 306 is a processor including circuits such as a split circuit, a screen circuit, and a pallet circuit, which is capable of performing various processes for displaying images on the liquid crystal display panel 310.

To the VDP 306, a video RAM 308, for storing image data responsive to the image display command issued by the CPU 303, and an image data ROM 309, which stores data for displaying a variety of effect images, are connected. Further, to the VDP 306, a driving circuit 307, which outputs a drive signal for driving the liquid crystal display panel 310, is also connected.

The CPU 303 of the common display device 300 reads and executes the display control program stored in the ROM 304. In addition, this CPU reads from the image data ROM 309 the image data for images to be displayed. Further, this CPU further causes the video RAM 308 to store the reading and drives the driving circuit through the VDP 306, thereby displaying images on the liquid crystal display panel 310.

The ROM 304 of this common display device 300 is caused to store the group management table as shown in FIG. 7, the reserved-amount management table shown in FIG. 8, the link game establishment flag table shown in FIG. 9, and the lottery right management table shown in FIG. 10. Therefore, even failure to additionally install a control device 200 such as a server allows players to execute a variety of processes such as reservation in groups, management of lottery rights acquired by the gaming machines 10, and determination of a timing of the establishment.

Further, advantageous effects described in the embodiments of the present invention are merely exemplified as the most preferable effects derived from the present invention. The advantageous effects according to the present invention are not limitative to those described in the embodiments thereof.

What is claimed is:

1. A gaming system, comprising:

a plurality of gaming machines; and a control device connected to the gaming machines, wherein:

each of the gaming machines has:

a display device, which displays a plurality of symbols;

a respective controller configured to execute instructions to rearrange symbols arranged on the display device after gaming mediums are betted, and thereafter, execute a base game in which a payment is made in accordance with the rearranged symbols; and a respective communication interface, which transmits information pertinent to the betted gaming mediums to the control device, together with information for identifying a transmission source, and wherein:

the control device has:

a memory, which stores identification information for identifying a gaming machine associated with a common game executed simultaneously in groups and identification information for identifying a group to which the gaming machine belongs;

a control device communication interface, which receives information transmitted from each of the gaming machines; and a control device controller configured to execute instructions to:

specify a group to which a transmission source of information received by the control device communication interface belongs, based upon the information stored in the memory;

accumulatively sum up a reserved amount in the specified group, and then, storing the sum in the memory in order to reserve part of the gaming mediums betted at the gaming machine as the transmission source in groups to which the gaming machines belong; and execute part of a computation required to execute the common game;

determine a timing of transferring the base game to the common game in groups;

start the common game at a gaming machine belonging to one group, in a case where the timing is established in said one group; and postpone commencement of the common game in another group in a case where the timing is established in said another group while the common game is executed in said one group.

2. The gaming machine according to claim 1, comprising, in groups, common display devices connected to respective ones of the gaming machines belonging to the groups, wherein one of the common display devices provided in the groups has the control device.

3. A control method of performing a common game in groups comprising a plurality of gaming machines, each gaming machine having a respective processor, said method comprising the steps of:

at each of the gaming machines, via the respective processor, rearranging symbols arranged on the display devices after gaming mediums are betted, and thereafter, executing a base game in which a payment is made in accordance with the rearranged symbols; and via the respective processor, transmitting information pertinent to betted gaming mediums and information for identifying a transmission source to a control device connected via a communication interface, the control device having a control processor; and at the control device, via the control processor, specifying a group to which a transmission source of received information belongs;

via the control processor, accumulatively summing up a reserved amount in the specified group, and then, storing the sum in the memory in order to reserve part of the gaming mediums betted at the gaming machine as the transmission source in groups to which the gaming machines belong;

via the control processor, determining a timing of transferring the base game to the common game in groups;

via the control processor, starting the common game at a gaming machine belonging to one group, in a case where the timing is established in said one group; and via the control processor, postponing commencement of the common game in another group in a case where the timing is established in said another group while the common game is executed in said one group.

* * * * *